(12) United States Patent
Sobl et al.

(10) Patent No.: US 12,275,073 B2
(45) Date of Patent: Apr. 15, 2025

(54) MOBILE HAND-HELD MACHINE SAW WITH SCORING ASSEMBLY AND DUST EXTRACTION

(71) Applicant: Festool GmbH, Wendlingen (DE)

(72) Inventors: Philipp Sobl, Esslingen (DE); Wolfgang Spengler, Neidlingen (DE); Marco Haible, Wernau (DE)

(73) Assignee: Festool GmbH, Wendlingen (DE)

( * ) Notice: Subject to any disclaimer, the term of this patent is extended or adjusted under 35 U.S.C. 154(b) by 313 days.

(21) Appl. No.: 17/782,706

(22) PCT Filed: Dec. 13, 2020

(86) PCT No.: PCT/EP2020/085878
§ 371 (c)(1),
(2) Date: Jun. 6, 2022

(87) PCT Pub. No.: WO2021/116481
PCT Pub. Date: Jun. 17, 2021

(65) Prior Publication Data
US 2023/0008308 A1    Jan. 12, 2023

(30) Foreign Application Priority Data
Dec. 13, 2019  (DE) .......................... 102019134415.8

(51) Int. Cl.
*B23D 45/10*    (2006.01)
*B23D 45/16*    (2006.01)
(Continued)

(52) U.S. Cl.
CPC ......... *B23D 45/105* (2013.01); *B23D 45/165* (2013.01); *B27B 9/02* (2013.01); *B27G 19/04* (2013.01); *B27G 19/10* (2013.01)

(58) Field of Classification Search
CPC ... B27B 9/02; B25F 5/02; B25F 5/008; B27G 19/10; B27G 19/00; B27G 19/02;
(Continued)

(56) References Cited

U.S. PATENT DOCUMENTS 3,007,501 A * 11/1961 Mundell .................. B23Q 1/58
144/1.1
4,241,505 A * 12/1980 Bodycomb, Jr. .... B23D 59/006
83/100
(Continued)

FOREIGN PATENT DOCUMENTS

CN            1464816 A      12/2003
CN            1506194 A       6/2004
(Continued)

OTHER PUBLICATIONS

Chinese Office Action of Apr. 14, 2023.
Japanese Office Action dated Aug. 6, 2024.

*Primary Examiner* — Evan H MacFarlane
*Assistant Examiner* — Fernando A Ayala
(74) *Attorney, Agent, or Firm* — Hoffmann & Baron, LLP

(57) ABSTRACT

A mobile handheld machine saw having a saw assembly, which has a saw toolholder for a saw tool and a saw drive motor for driving the saw toolholder, and having a guide device, wherein the handheld machine saw has a scoring assembly, which is arranged in front of the saw assembly on the guide device with respect to the working direction, having a scorer toolholder for a scoring tool and having a scoring drive for driving the scorer toolholder, wherein a score upstream from the saw cut to be introduced in the working direction can be introduced into the workpiece by means of the scoring tool protruding in front of the guide surface in scoring operation of the handheld machine tool. It is provided that the scoring assembly has a scorer dust
(Continued)

extraction device for extracting particles arising during the introduction of the score by the scoring tool into the workpiece.

20 Claims, 12 Drawing Sheets

(51) Int. Cl.
*B27B 9/02* (2006.01)
*B27G 19/04* (2006.01)
*B27G 19/10* (2006.01)

(58) Field of Classification Search
CPC .. B23D 45/105; B23D 45/16; B23Q 11/0046; B23Q 11/086; Y10T 83/0215; Y10T 83/207
See application file for complete search history.

(56) References Cited

U.S. PATENT DOCUMENTS

| | | | | |
|---|---|---|---|---|
| RE32,986 E | * | 7/1989 | Dettelbach | B23D 45/105 83/881 |
| 4,994,627 A | | 7/1990 | Cuscurida et al. | |
| 5,069,695 A | * | 12/1991 | Austin | B23Q 11/0046 30/133 |
| 5,148,732 A | * | 9/1992 | Striebig | B27G 19/10 83/477.1 |
| 5,287,786 A | * | 2/1994 | Fiala | B23D 45/105 83/13 |
| 5,774,992 A | * | 7/1998 | Lindenmuth | B23D 59/006 30/124 |
| 5,822,864 A | * | 10/1998 | Campbell | B23D 59/002 30/390 |
| 5,979,525 A | * | 11/1999 | Durney | B27B 9/00 144/368 |
| 6,108,912 A | | 8/2000 | Radigan | |
| 7,465,328 B2 | * | 12/2008 | Trautner | B23D 59/006 451/270 |
| 7,578,063 B2 | * | 8/2009 | Martin | B27B 9/02 30/390 |
| 10,524,418 B1 | * | 1/2020 | Wright | A01D 34/005 |
| 2003/0005680 A1 | * | 1/2003 | Buss | A01D 34/66 56/6 |
| 2004/0117990 A1 | * | 6/2004 | Bohne | B24B 23/028 30/388 |
| 2004/0157540 A1 | | 8/2004 | Wendt et al. | |
| 2007/0180710 A1 | * | 8/2007 | Moore | B27G 19/04 30/391 |
| 2008/0011138 A1 | * | 1/2008 | Brazell | B28D 7/02 83/100 |
| 2009/0258584 A1 | * | 10/2009 | Huber | B25F 5/02 451/451 |
| 2012/0124948 A1 | * | 5/2012 | Nagasawa | B01D 45/16 55/340 |
| 2012/0318112 A1 | | 12/2012 | Muto | |
| 2018/0290221 A1 | | 10/2018 | Ogino et al. | |
| 2020/0086405 A1 | | 3/2020 | Ogino et al. | |
| 2020/0305345 A1 | * | 10/2020 | Kelly | A01D 34/71 |
| 2020/0352094 A1 | * | 11/2020 | Desai | A01D 42/005 |

FOREIGN PATENT DOCUMENTS

| | | | | |
|---|---|---|---|---|
| CN | 102665985 A | | 9/2012 | |
| CN | 208497187 U | | 2/2019 | |
| DE | 7324551 U | | 12/1973 | |
| DE | 9106212 U1 | | 1/1992 | |
| DE | 19581444 T1 | | 1/1997 | |
| EP | 0324444 A2 | | 7/1989 | |
| EP | 2 638 996 A1 | | 9/2013 | |
| EP | 3 323 571 A1 | | 5/2018 | |
| JP | 2-21850 A | | 8/1980 | |
| JP | 57-86783 U | | 5/1982 | |
| JP | 60-260306 A | | 12/1985 | |
| JP | 2010046781 | * | 8/2008 | B27Q 11/00 |
| JP | 2009-543700 A | | 12/2009 | |
| JP | 2018-176462 A | | 11/2018 | |
| JP | 2018-187768 A | | 11/2018 | |
| JP | 2019-188490 A | | 10/2019 | |
| KR | 2001-0017597 A | | 3/2001 | |
| KR | 10-2011-0076213 A | | 7/2011 | |
| WO | WO18224626 | * | 12/2018 | G08C 17/00 |

* cited by examiner

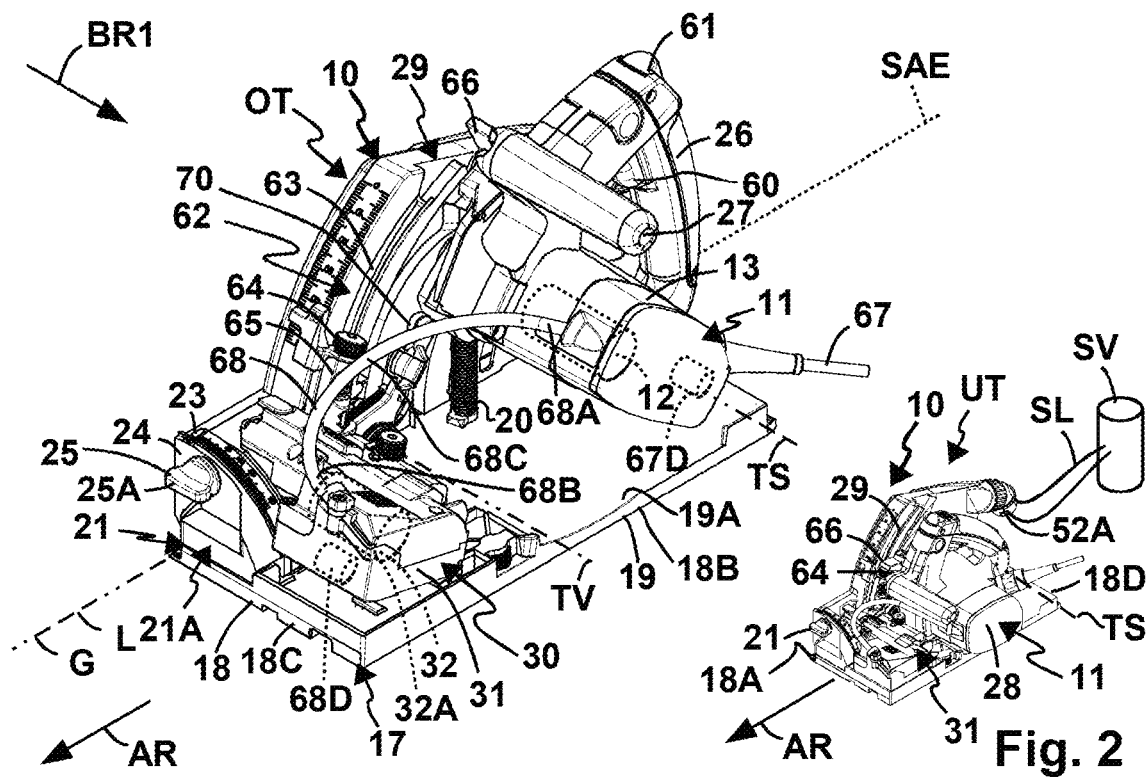
Fig. 1
Fig. 2
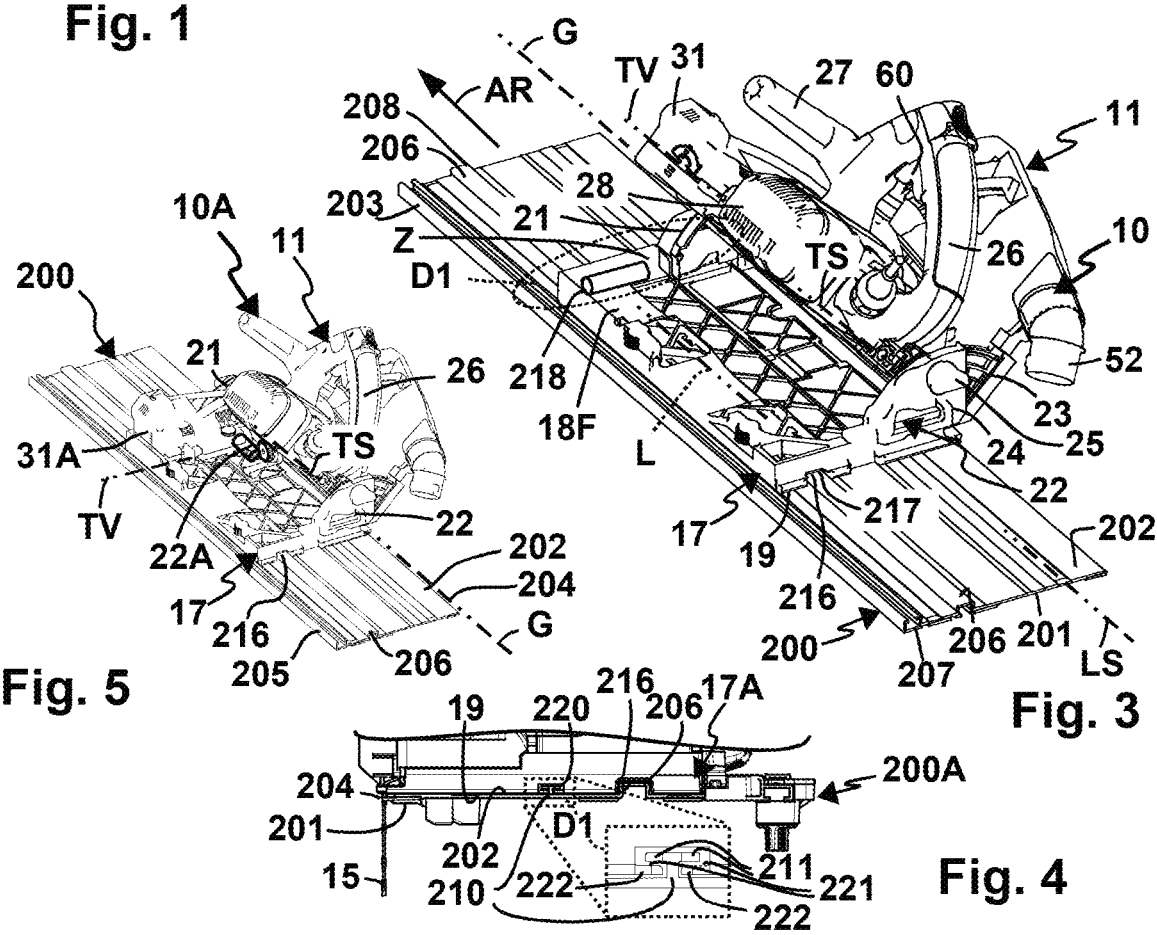
Fig. 5
Fig. 3
Fig. 4

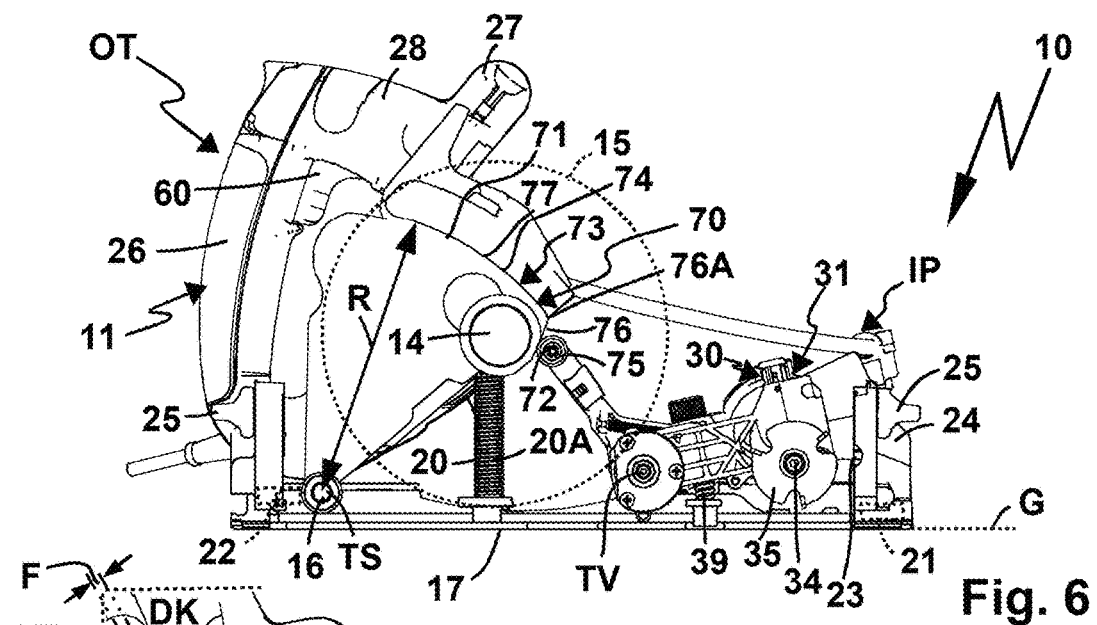
Fig. 6
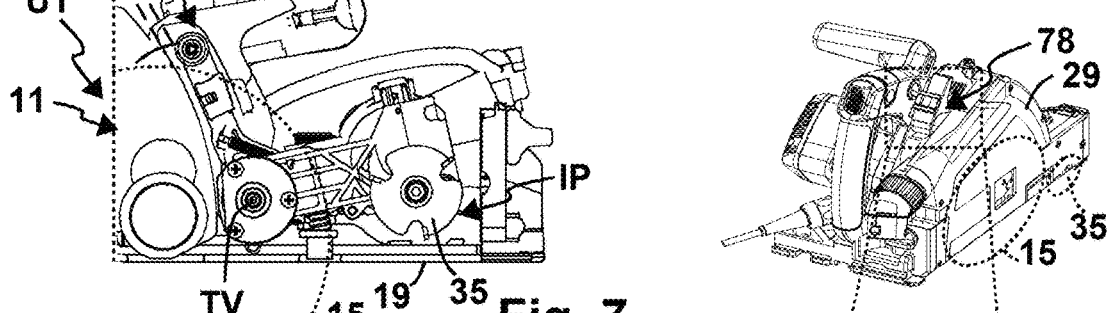
Fig. 7
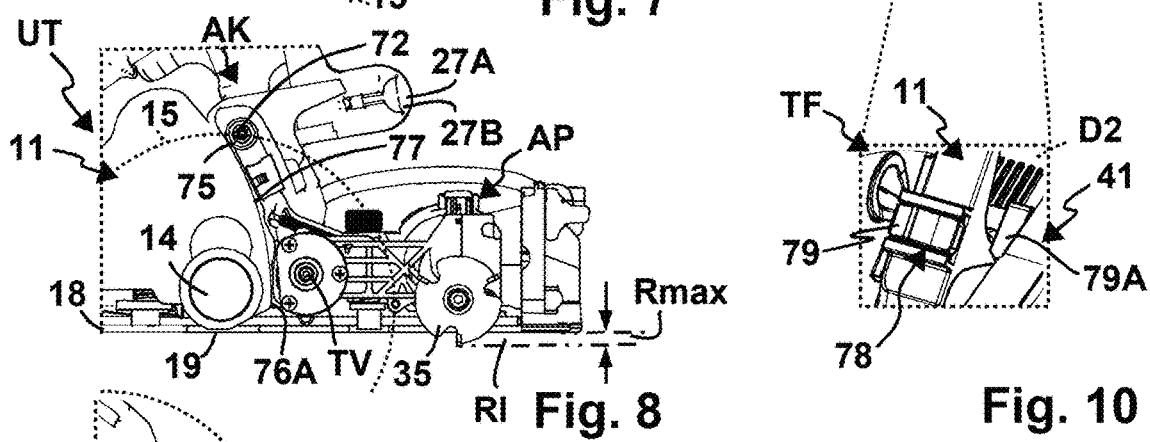
Fig. 8
Fig. 10
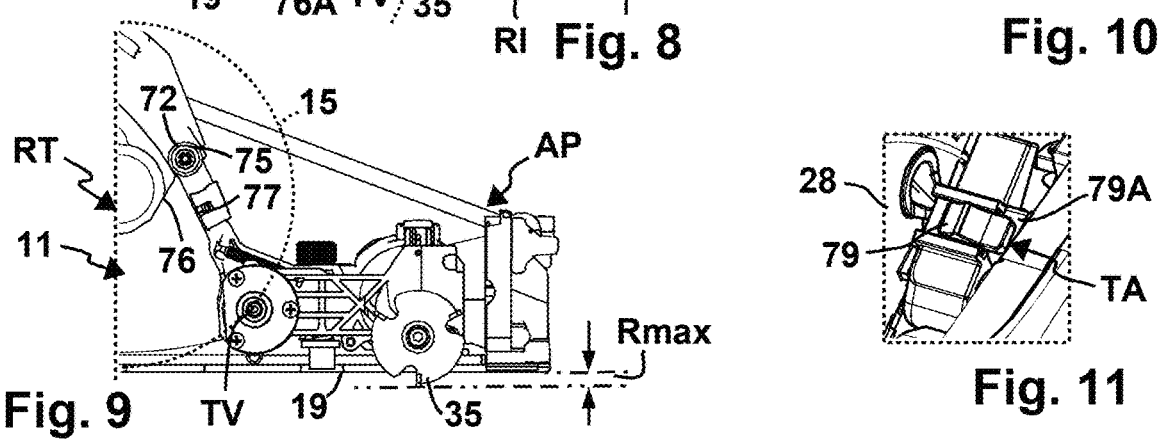
Fig. 9
Fig. 11

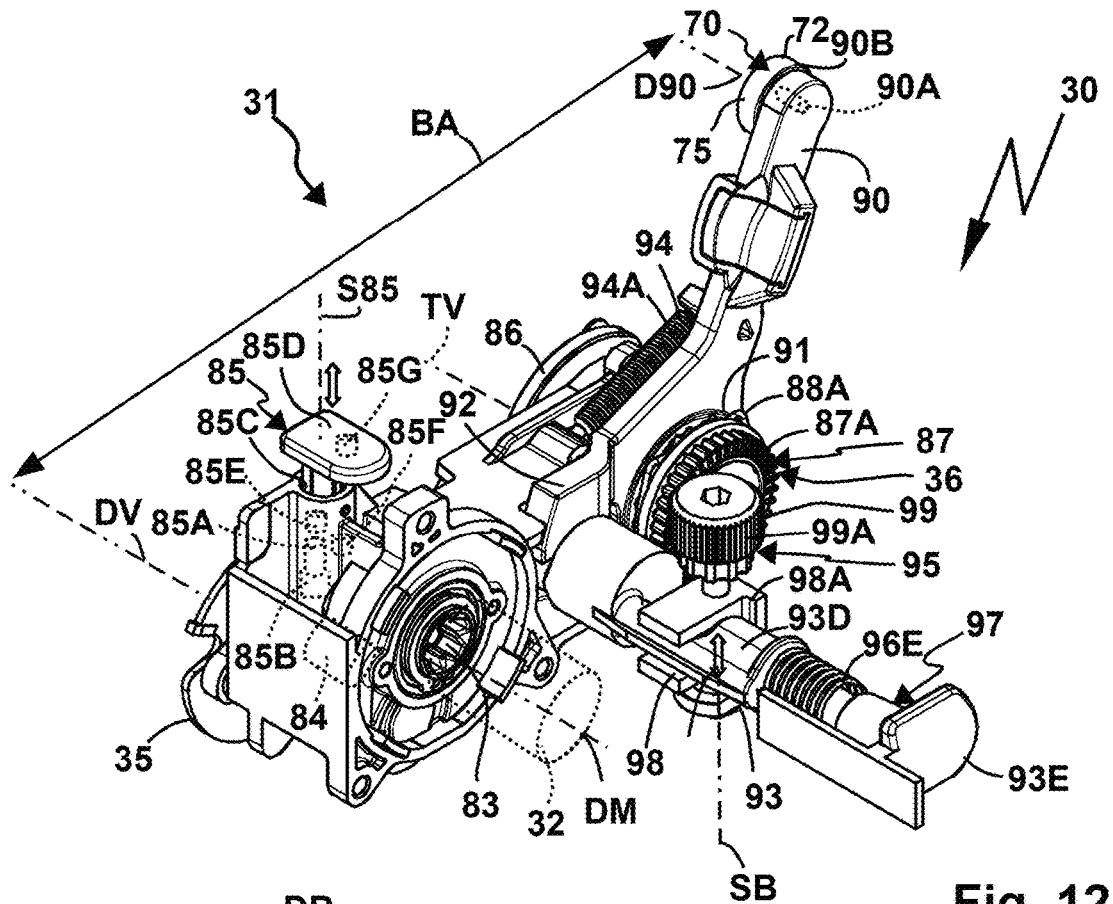
Fig. 12
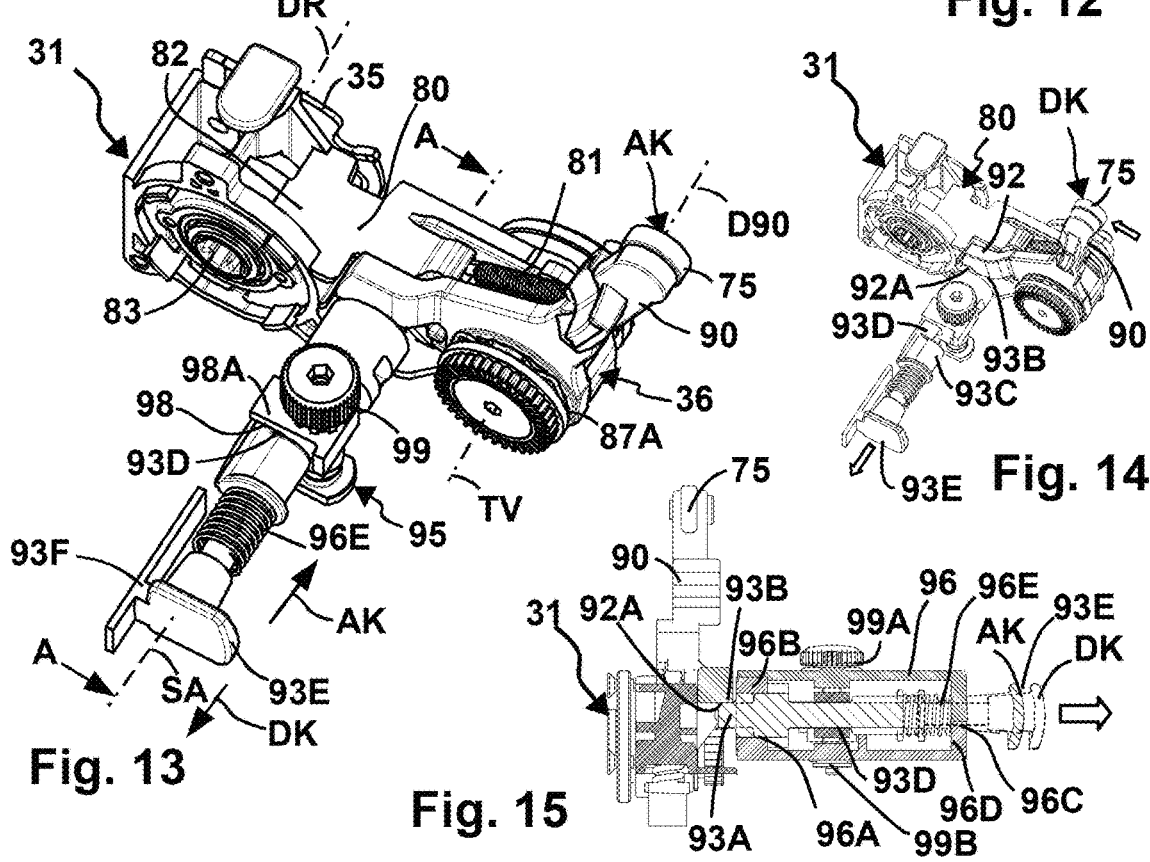
Fig. 13
Fig. 14
Fig. 15

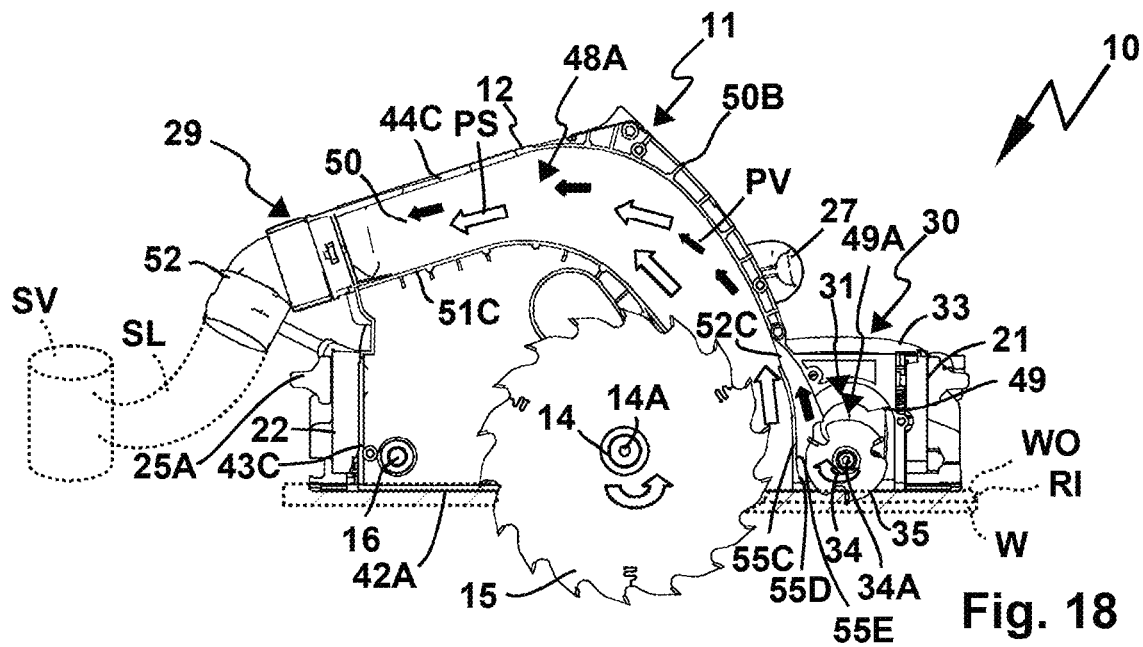
Fig. 18
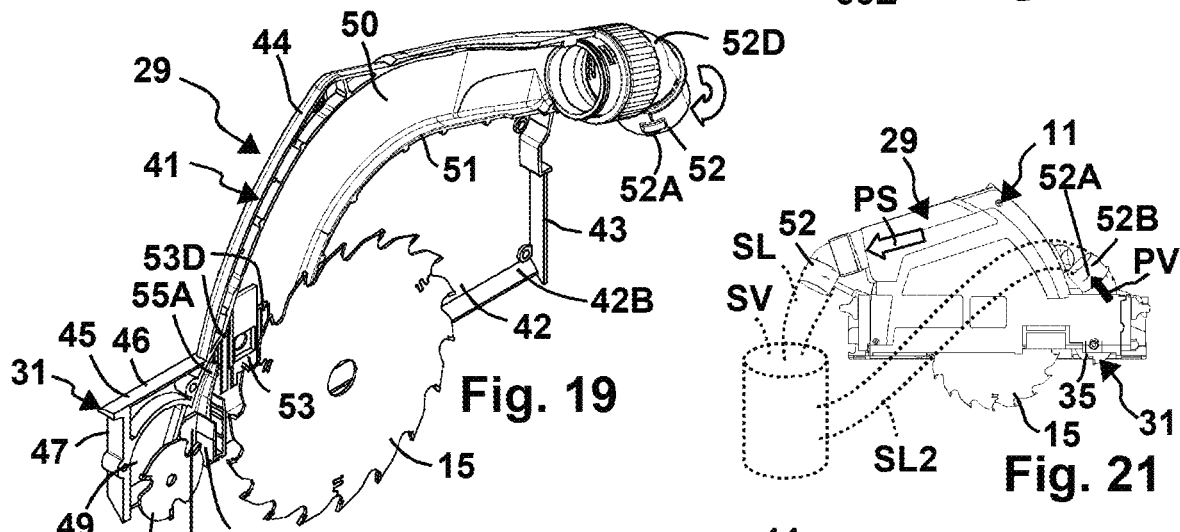
Fig. 19
Fig. 21
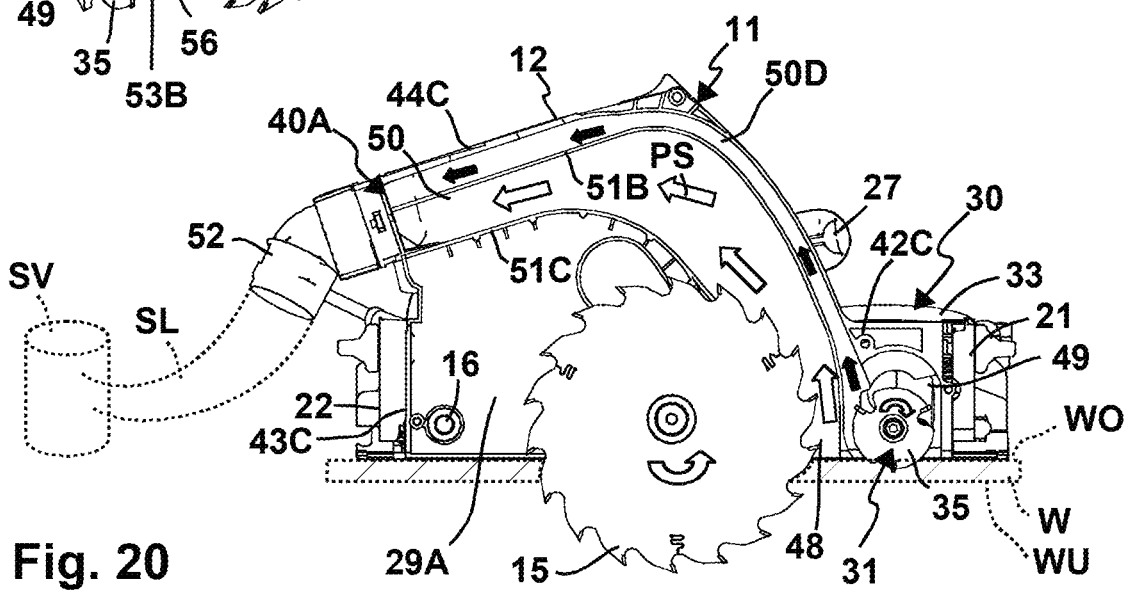
Fig. 20

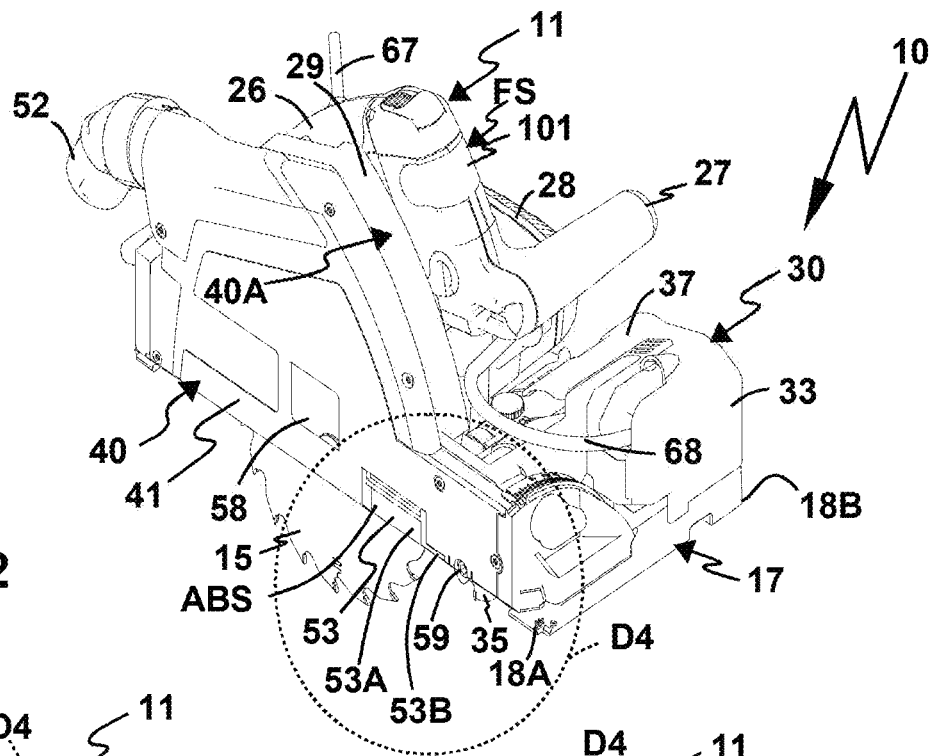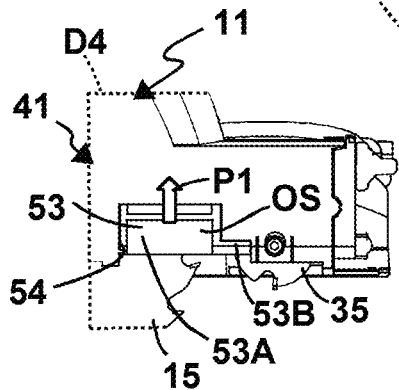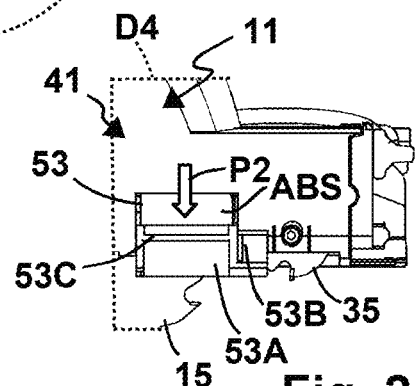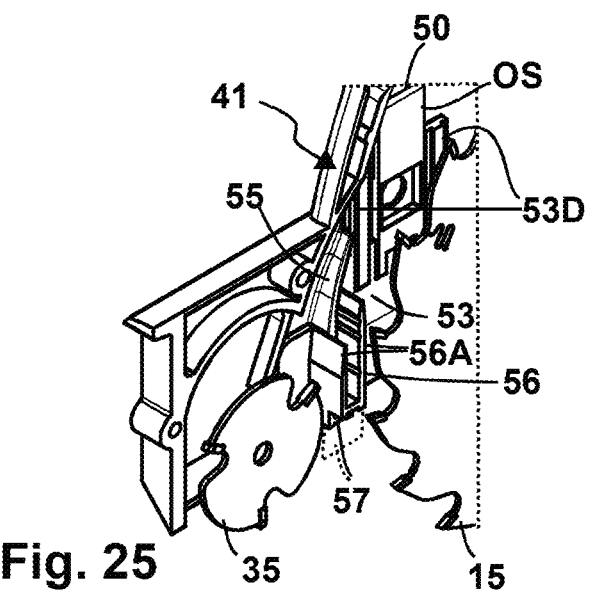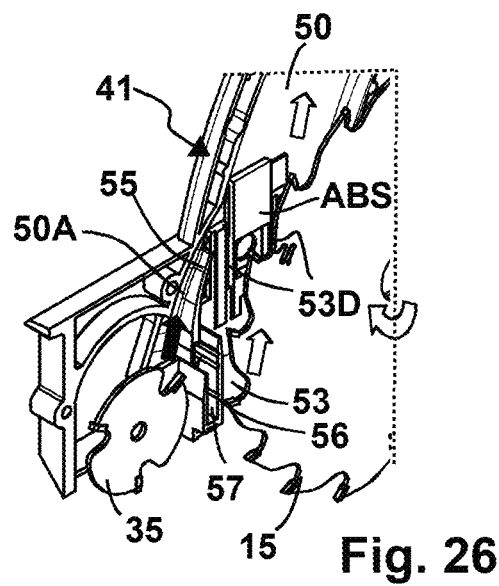

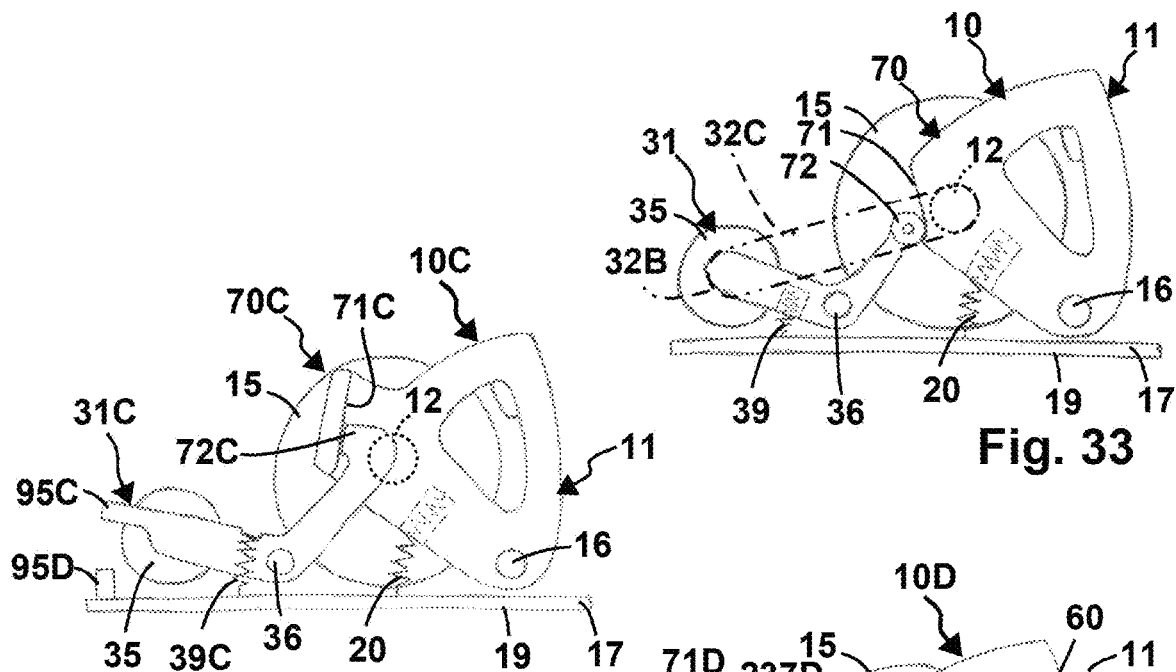
Fig. 33
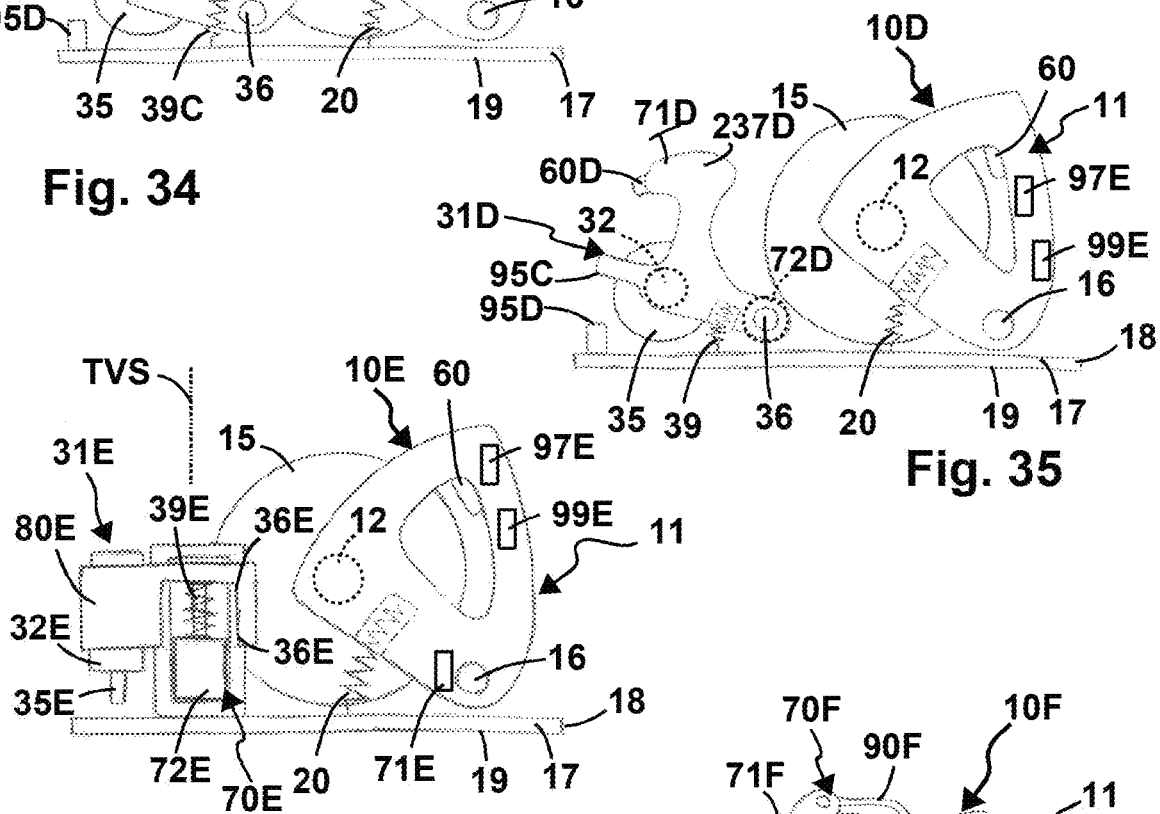
Fig. 34
Fig. 35
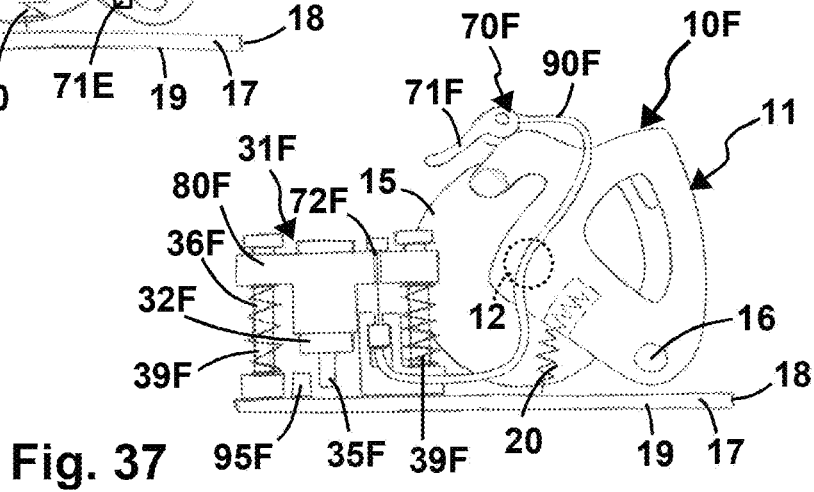
Fig. 36
Fig. 37

MOBILE HAND-HELD MACHINE SAW WITH SCORING ASSEMBLY AND DUST EXTRACTION

This application is a National Stage application based on International Application No. PCT/EP2020/085878, filed Dec. 13, 2020, which claims priority to DE 102019134415.8, filed Dec. 13, 2019.

BACKGROUND OF THE INVENTION

The invention relates to a mobile handheld machine saw having a saw assembly, which has a saw toolholder for a saw tool, in particular a saw blade, and a saw drive motor for driving the saw toolholder, and having a guide device, which has a guide surface extending along a longitudinal axis for guiding the handheld machine saw along a working direction on a workpiece or a guide rail, wherein a saw cut can be introduced into the workpiece along the working direction by means of the saw tool protruding in front of the guide surface in saw operation of the handheld machine tool, wherein the handheld machine saw has a scoring assembly arranged in front of the saw assembly on the guide device with respect to the working direction, having a scorer toolholder for a scoring tool, in particular a scoring saw blade, and having a scoring drive for driving the scorer toolholder, wherein a score upstream of the saw cut to be introduced in the working direction can be introduced into the workpiece by means of the scoring tool, which protrudes in front of the guide surface in scoring operation of the handheld machine tool.

Such a handheld machine saw is described, for example, in EP 0 324 444 A2. Saw cuts can be introduced into the workpiece using the known handheld machine saw, in which the saw blade does emerge on the upper side of the workpiece, but does not induce damage, for example torn out chips, etc., or does so to a decreased extent there due to the score introduced by the scoring assembly. However, the handling of the known handheld machine saw is impeded, for example, in that the scoring tool is poorly visible, in order to guide the handheld machine tool along a planned score or a planned saw cut on the workpiece.

Handheld machine saws having scoring assemblies are known, for example, from DE 73 24 551 U1, DE 91 06 212 U1, U.S. Pat. No. 5,287,786, and DE 195 81 444 Ti.

US 2020/0086405 A1 also describes a handheld machine saw.

SUMMARY OF THE INVENTION

It is therefore the object of the present invention to provide an improved handheld machine saw.

To achieve this object, it is provided in a handheld machine saw of the type mentioned at the outset that the scoring assembly has a scorer dust extraction device for extracting particles resulting during the introduction of the score into the workpiece by way of the scoring tool.

It is a basic concept here that dust extraction takes place in particular in the region of the scoring assembly, i.e., particles arising there are effectively conveyed away from the scoring tool, so that a cleaner work area is available for the operator. The workpiece does not become soiled. The operator is not annoyed by the dust. They work area in which the scoring tool penetrates into the workpiece or exits from the workpiece is better visible if particles, dust, and chips are guided away by the scorer dust extraction device.

In the following description, the terms dust and particles are used equivalently. Dust is understood to include particles, dust, and saw chips.

In principle, it is possible that the scoring tool, in particular in a design as a milling tool or the like, is arranged freely on the guide device. However, it is preferably provided in the handheld machine tool that it has a scoring tool receptacle space for accommodating the scoring tool, which is fluidically connected to a dust extraction fitting suitable and designed in particular for connection of a suction hose, via which particles can flow out of the scoring tool receptacle space.

It is also advantageous with respect to the saw tool if a receptacle space is provided for the accommodation thereof. The handheld machine saw preferably has a saw tool receptacle space for the saw tool.

These scoring tool receptacle space and/or the saw tool receptacle space form, for example, a dust space or protective space in which the scoring tool or saw tool, respectively, is accommodated in particular with its section not protruding in front of the guide surface for processing the workpiece. A section of the scoring tool or the saw tool provided for processing the workpiece protrudes in front of the respective receptacle space in an active position.

The dust extraction fitting for the saw tool receptacle space is preferably fluidically connected via a dust extraction channel to the scoring tool receptacle space. The dust extraction channel can extend, for example, in a protective hood or a protective housing of the handheld machine saw.

The dust extraction fitting for the saw tool receptacle space is preferably arranged at the rear on the handheld machine saw in the working direction.

The handheld machine saw advantageously has a cover wall for covering the saw tool receptacle space and/or the scoring tool receptacle space, on which a viewing window is arranged, through which at least a part of the scoring tool and/or the saw tool is visible, wherein a cover element on the viewing window is mounted movably between an open position exposing the viewing window and a cover position covering the viewing window by means of a bearing, in particular a slide bearing. In the cover position, the cover element preferably covers a working region of the saw tool and/or the scoring tool, in particular an exit region of the saw tool or the scoring tool out of the workpiece, and exposes it in the open position. The cover element forms, for example, a protective cover. The cover element is preferably mounted on the cover wall by means of a slide bearing. A pivot mounting or combined pivot-slide mounting is readily possible. The working region is, for example, a visible region or such a region which is advantageously visible by the operator during use of the handheld machine saw or during introduction of the saw cut or the score, in particular to guide the handheld machine tool along the workpiece.

The cover element can be opaque, for example. However, it is advantageous if the cover element is entirely or at least partially transparent or translucent, so that the part or the working region of the saw tool or scoring tool is visible through the cover element in its cover position.

The cover element advantageously comprises a plate body or is formed by a plate body.

It is possible in principle that the cover element has a rectangular outer circumferential contour, for example.

However, the cover element preferably has a stepped contour. For example, it is advantageous if the cover element has a scoring tool section for covering a part of the scoring tool and a saw tool section for covering a part of the saw tool. Both sections can be equal in size or can have equal longitudinal extensions. However, it is advantageous if the scoring tool section and the saw tool section have different area extensions and/or longitudinal extensions, in particular in a longitudinal direction orthogonal to the guide surface and/or in a longitudinal direction parallel to the guide surface.

It is advantageous if the saw tool receptacle space and the scoring tool receptacle space are separated from one another by at least one partition wall. The partition wall is located, for example, between sides, in particular narrow sides, of the scoring tool and the saw tool opposite to one another.

The partition wall preferably extends up to the guide surface, in particular if the saw tool and/or the scoring tool are oriented orthogonally to the guide surface. The partition wall preferably has a partition wall section which in particular directly adjoins the guide surface. Both measures contribute to separating the chip spaces of scoring tool and saw tool directly in the region of the workpiece surface, thus where chips arise.

It is to be mentioned at this point that the scoring tool and the saw tool are preferably disk-shaped saw blades. The scoring tool and the saw tool rotate in opposite directions in operation, i.e., so that they generate chips which are thrown toward one another during the introduction of a score or a saw cut, respectively, into the workpiece. The at least one partition wall ensures that the chips generated by the saw tool do not flow toward the scoring tool and the chips generated by the scoring tool do not flow toward the saw tool.

The partition wall can be a one-piece partition wall. It is also possible that multiple partition walls are provided. One preferred exemplary embodiment provides that the at least one partition wall has a fixed partition wall section and a partition wall section movable in relation to the fixed partition wall section. A distance can be present in principle between the partition wall sections. However, it is advantageous if the partition wall sections are arranged adjacent to one another and in one or more, preferably each relative position in relation to one another, which are provided for working operation of the handheld machine saw, adjoin or overlap one another directly or in such a way that they form a closed or essentially closed flow wall, along which a particle flow containing the particles generated by the scoring tool or the saw tool can flow. Therefore, the flow wall can be essentially or entirely closed in each relative position which the partition wall sections can assume in relation to one another. However, it is also possible that the partition wall sections only form the flow wall when the handheld machine saw is set for working operation. Thus, for example, if the above-mentioned cover element is in the cover position, the partition wall sections form the flow-tight or essentially closed flow wall.

However, intermediate spaces, for example slots or gaps, between the partition wall sections are possible. An intermediate space between the partition wall sections is preferably oriented and/or arranged, however, so that a particle flow is deflected past the intermediate space and does not penetrate the intermediate space.

It is advantageous, however, if the partition wall sections are designed to be interlocking. For example, it is advantageous if one of the partition wall sections has partition wall receptacle, which is in particular U-shaped, for engaging the other partition wall section when the movable partition wall section is adjusted toward the fixed partition wall section, and/or the partition wall sections are designed to be telescopic.

It is particularly preferred if the movable partition wall section is arranged on the cover element. For example, the movable partition wall section protrudes at an angle from a cover section of the cover element which covers the working region of the saw tool and/or the scoring tool in the cover position. The partition wall section is arranged, for example, between the saw tool section and the scoring tool section of the cover element.

It is advantageous if the handheld machine saw has a flow guiding surface, which is arranged in particular on the partition wall, in particular an inlet bevel and/or baffle surface, at or adjacent to an exit region of the scoring tool from the workpiece. The flow guiding surface is opposite, for example, to a narrow side of a disk-shaped scoring tool.

It is furthermore advantageous if the saw assembly has a saw dust extraction device for extracting particles arising during the introduction of the saw cut by the saw tool. Chips, dust, and particles generated by the saw tool are therefore also effectively removable from a working region of the saw tool.

It is preferably provided that the saw dust extraction device has a dust extraction fitting which is in particular suitable and designed for connecting a suction hose and is fluidically connected to the saw tool receptacle space, so that particles can flow out of the saw tool receptacle space via the dust extraction fitting. Particles can thus flow out of the saw tool receptacle space and the scoring tool receptacle space, for example, can be suctioned off, via a single dust extraction fitting.

The dust extraction fitting fluidically connected to the saw tool receptacle space is advantageously also fluidically connected to the scoring tool receptacle space, so that particles generated by the scoring tool can flow out of the scoring tool receptacle space via the dust extraction fitting.

The dust extraction fitting fluidically connected to the saw tool receptacle space can also advantageously be a dust extraction fitting separate from the dust extraction fitting fluidically connected to the scoring tool receptacle space. The handheld machine saw thus has two dust extraction fittings, namely for the saw tool receptacle space and the scoring tool receptacle space.

The dust extraction fitting for the scoring tool receptacle space and/or for the saw tool receptacle space comprises, for example, a tubular body and/or fitting connecting piece, onto which a suction hose is pluggable. The suction hose leads, for example, to a vacuum cleaner, which is mobile in particular, in particular to a workshop vacuum cleaner, or is a component of the vacuum cleaner. The suction hose can also be a component of a stationary vacuum system. A formfitting contour for the formfitting connection of the suction hose or a fitting connecting piece of the suction hose is preferably provided on the dust extraction fitting. The tubular body or fitting connecting piece can be rotatably mounted on the handheld machine tool, so that the suction hose connected to the tubular body or fitting connecting piece is pivotable relative to the handheld machine saw.

It is advantageous if the dust extraction fitting fluidically connected to the saw tool receptacle space is fluidically connected via a dust extraction channel to the saw tool receptacle space, wherein the dust extraction channel is separated at least in sections by an intermediate wall from a dust extraction channel fluidically connected to the scoring tool receptacle space, in particular at an exit region at which the scoring tool and the saw tool exit from the workpiece.

The intermediate wall can be a very short intermediate wall. It is advantageous, for example, if the intermediate wall only extends up to the saw tool receptacle space.

It is also possible that the intermediate wall extends along the saw tool receptacle space up to the dust extraction fitting, so that particle flows generated by the saw tool and by the scoring tool are only mixed with one another on the outflow side in the region of the dust extraction fitting.

The saw tool receptacle space and the scoring tool receptacle space are advantageously provided in a shared protective housing for accommodating the saw tool and the scoring tool. It is also possible that separate protective housings are provided for the saw tool and the scoring tool.

It is furthermore advantageously provided that the saw toolholder, in particular the saw assembly as a whole, is movably mounted on or with respect to the guide device by means of a saw depth setting bearing between an upper depth setting position and at least one lower depth setting position, wherein the saw tool protrudes farther in front of the guide surface in the lower depth setting position than in the upper depth setting position. Saw cuts of different depths can thus be introduced into the workpiece, for example.

Furthermore, it is preferred if the scorer toolholder, in particular the scoring assembly as a whole, is movably mounted on or with respect to the guide device by means of a scorer depth setting bearing, which is separate from the saw depth setting bearing, between at least one active position, in which the scoring tool arranged on the scorer toolholder protrudes from the guide surface, and an inactive position, in which the scoring tool is adjusted behind the guide surface. The scoring tool can thus be adjusted into the inactive position, for example, when a score is not to be produced.

The saw depth setting bearing and the scorer depth setting bearing are preferably arranged in a longitudinal distance with respect to the working direction on the guide body.

The saw depth setting bearing and the scorer depth setting bearing are preferably arranged separately from one another on the guide body.

The saw depth setting bearing and the scorer depth setting bearing preferably have no shared bearing components.

The scoring tool and/or the saw tool are preferably designed as a saw blade, in particular a circular saw blade. However, it would also be possible in principle that the saw tool is, for example, a jigsaw blade or similar other saw blade of a noncircular type. Furthermore, the scoring tool can also, for example, comprise a milling head or a milling tool or can be formed thereby.

An embodiment of saw tool and scoring tool as a saw blade is preferred. One advantageous embodiment provides that the ratio of an external diameter of the saw tool to an external diameter of the saw drive motor is greater, in particular at least 1.5 times greater, preferably two times greater, more preferably at least 2.5 times greater than a ratio of the external diameter of the scoring tool to an external diameter of the scorer drive motor.

The handheld machine saw is a machine saw to be guided manually along the workpiece. The machine can be guided freely over the workpiece, i.e., operated without a guide rail. However, operation with a guide rail is preferred. The handheld machine saw is preferably a plunge saw and/or does not have a protective cover for a section of the saw tool and/or the scoring tool protruding freely in front of the guide surface.

The saw assembly and the scoring assembly are arranged on an upper side of the guide device opposite to the guide surface. The guide device comprises, for example, a so-called saw table. The guy device or the guide body preferably comprises a plate body, on one side of which the guide surface is arranged and on the side of which opposite to the guide surface or the upper side of which the saw assembly and the scoring assembly are arranged. Guide receptacles, for example longitudinal grooves or the like, for guide ribs or guide projections of a guide rail are preferably arranged on the guide surface.

The saw drive motor and/or the scorer drive motor are preferably electrical motors, in particular universal motors or brushless, electronically commutated motors or DC motors. Different motor types can be used as the saw drive motor and scorer drive motor, for example, an electronically commutated motor as the saw drive motor and a DC motor as the scorer drive motor.

BRIEF DESCRIPTION OF THE DRAWINGS

An exemplary embodiment of the invention is explained hereinafter on the basis of the drawings. In the figures:

FIG. 1 shows a perspective diagonal view diagonally from the front of a handheld machine saw having a saw assembly and a scoring assembly in an upper depth setting position, FIG. 2 shows the handheld machine saw according to FIG. 1, but in a lower depth setting position, FIG. 3 shows the handheld machine saw according to FIGS. 1 and 2 on a guide rail in a miter location and viewed diagonally from the rear, FIG. 4 shows a detail view from FIG. 3 from frontally forward of a lower part of the handheld machine saw and of the guide rail, wherein a guide body of the handheld machine saw and the guide rail engage in one another with additional engaging-behind contours, FIG. 5 shows a variant of the handheld machine saw according to the above figures having a scoring assembly pivotable separately from the saw assembly around a miter axis or a scoring assembly fixed in place with respect to the miter axis, FIG. 6 shows a side view of the handheld machine saw according to FIG. 1, approximately in a viewing direction BR1 having open protective housing and its saw assembly in an upper depth setting position, FIG. 7 shows a right part of the view according to FIG. 6, wherein the saw assembly is adjusted into a lowermost depth setting position, but the scoring assembly is inactive, FIG. 8 shows the view according to FIGS. 6 and 7, but having saw assembly adjusted into a lowermost depth setting position and scoring assembly adjusted into an active position, FIG. 9 shows the view according to FIG. 8, but having saw assembly adjusted into an only-scoring depth setting position and scoring assembly adjusted into the active position, FIG. 10 shows an only-scoring depth stop device in a release position, which enables an adjustment of the saw assembly according to FIG. 8, as a detail D2 of the handheld machine saw additionally shown diagonally from the rear as a whole in FIG. 10, FIG. 11 shows the only-scoring depth stop device according to FIG. 10, but in its stop position, which corresponds to an only-scoring depth setting position of the saw assembly, FIG. 12 shows a detail view of the scoring assembly diagonally from the front, approximately from the viewing direction of FIG. 1, FIG. 13 shows the scoring assembly according to FIG. 12, but diagonally from the rear, approximately corresponding to the viewing direction in FIG. 3, in an activation position, FIG. 14 shows the view of the scoring assembly according to FIG. 13, wherein the scoring assembly is adjusted into a deactivation position, FIG. 15 shows a section through the scoring assembly according to FIG. 13, approximately along a line of section A-A through its deactivation device, FIG. 18 shows a side view of the handheld machine saw according to the above figures having open protective housing, approximately corresponding to the view according to FIG. 6, FIG. 19 shows a cover of the protective housing diagonally from the front, approximately in the perspective according to FIG. 1, FIG. 20 shows a view similar to FIG. 18 of a variant of the handheld machine saw, FIG. 21 shows a further variant of the handheld machine saw from the side, approximately corresponding to the viewing direction BR1 in FIG. 1, FIG. 22 shows the handheld machine saw according to the above figures diagonally from the front, wherein the protective housing is closed using the cover according to FIG. 19, FIG. 23 shows a front detail D4 of the view according to FIG. 22 having a cover element adjusted into an open position, FIG. 24 shows the view according to FIG. 23, but having cover element adjusted into a cover position, FIG. 25 shows a subsection of the cover according to FIG. 19 having cover element adjusted into the open position, corresponding to the partial view according to FIG. 23, FIG. 26 shows a view according to FIG. 25, but having cover element adjusted into cover position, FIG. 33 shows a schematic view of the handheld machine saw according to the above figures from the side, FIG. 34 shows a variant of the handheld machine saw according to FIG. 33 having another driving device, FIG. 35 shows a schematic view of a handheld machine saw having a manually and individually activatable scoring assembly, FIG. 36 shows a handheld machine saw having a scoring assembly which is adjustable by a motor, FIG. 37 shows a handheld machine saw having a scoring assembly manually actuatable via a force transmission element.

DETAILED DESCRIPTION

Figure 16:
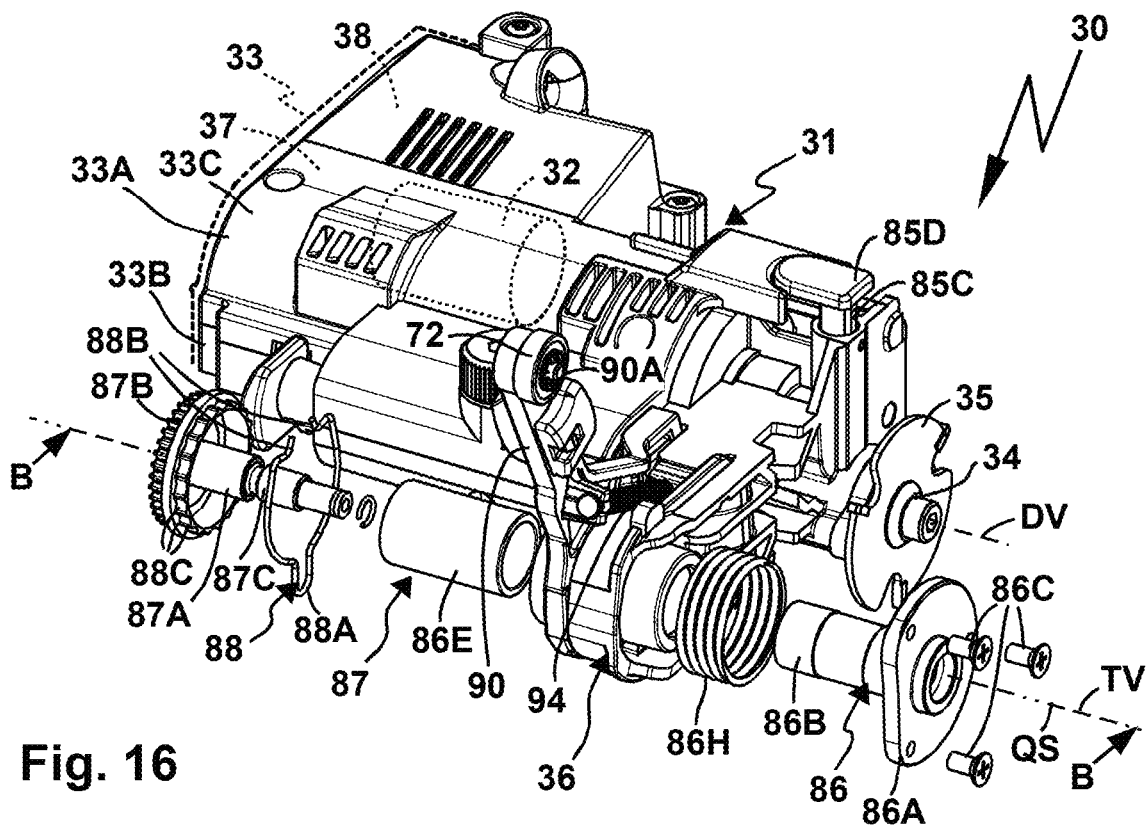
FIG. 16 shows a view diagonally from the front of the scoring assembly of the handheld machine saw according to FIG. 1.
Figure 17:
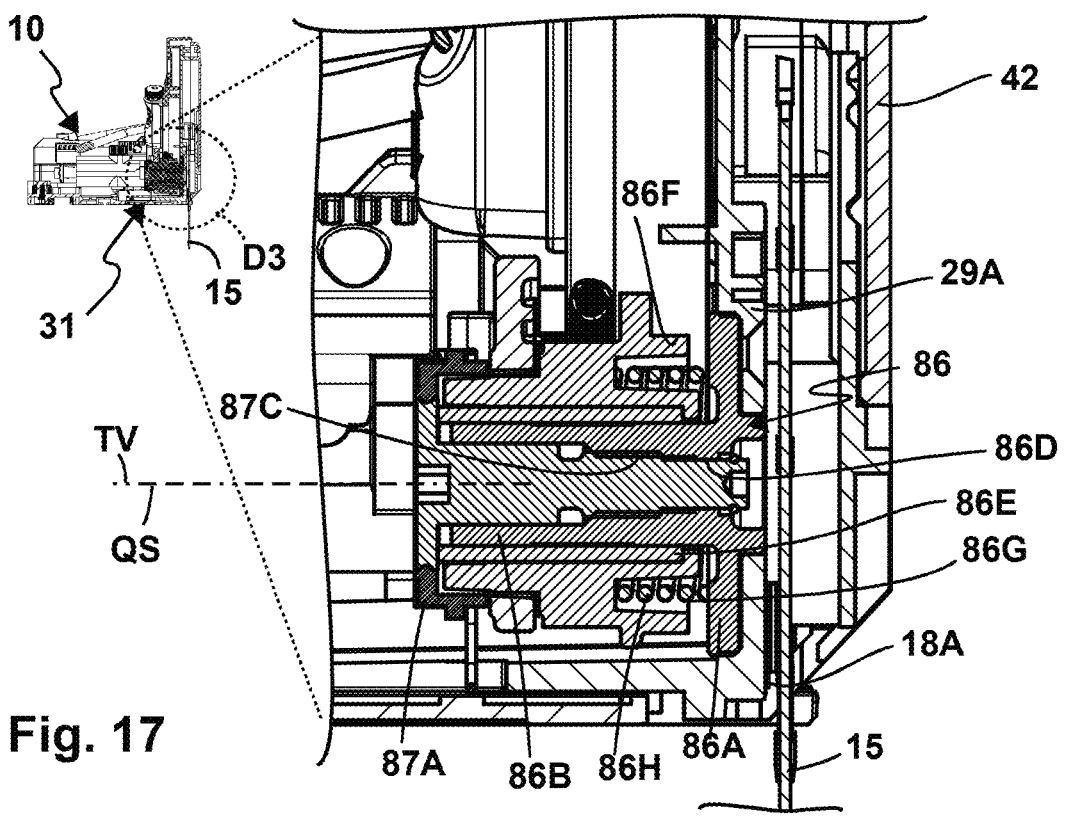
FIG. 17 shows a partial section through the scoring assembly according to FIG. 16, approximately along a line of section B-B, wherein in addition a section through the handheld machine saw as a whole is shown in a smaller illustration to visualize the detail D3 shown in FIG. 17.
Figure 27:
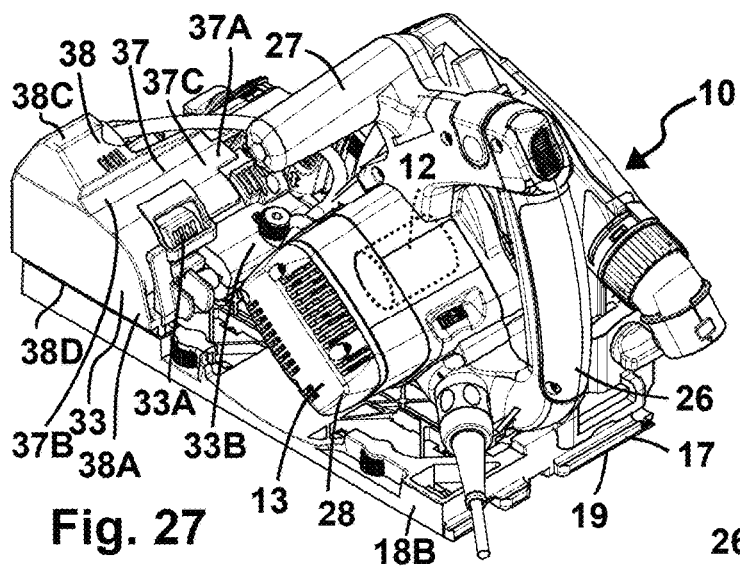
FIG. 27 shows the handheld machine saw according to FIG. 1 diagonally from the rear to illustrate a scorer handle body.

A handheld machine saw 10 is designed, for example, like a plunge saw, but could also have, for example, a retractable hood or similar other protective cover and can thus be a portable circular saw.

The handheld machine saw 10 has a saw assembly 11 having a saw drive motor 12, which is accommodated in a motor housing part 28 of a saw assembly housing 13. The saw drive motor 12 drives, directly or via a gearing not visible in the drawing, a saw toolholder 14, on which a saw tool 15 is arrangeable or arranged. For example, a holding screw or a holding element 14A is used to hold the saw tool 15 on the saw toolholder 14.

The saw assembly 11 is pivotable as a whole around a depth setting axis TS with respect to a guide device 17, on which the saw assembly 11 is arranged, by means of a saw depth setting bearing 16. By way of such a pivot movement, the saw tool 15 is settable between an upper depth setting position OT and multiple lower depth setting positions, for example, a lowermost depth setting position UT according to FIG. 2 or 8. In the lower depth setting positions UT, the saw tool 15 protrudes in front of a guide surface 19 of a guide body 18 of the guide device 17, for example, to introduce a saw cut into a workpiece W.

The guide body 18, and therefore the handheld machine saw 10 as a whole, can be guided with the guide surface 19, for example, directly along a workpiece upper side WO of the workpiece W in a working direction AR. The guide surface 19 extends with a longitudinal axis L parallel to the working direction AR.

The guide body 18 can also, for example, be guided along an upper side or guide surface 202 of a guide rail 200, however, which can be laid with its lower side 201 on the workpiece W. Particularly exact and straight saw cuts can thus be introduced into the workpiece W.

The guide rail 200 has a long design having long narrow sides 203, 204 extending along a longitudinal axis LS of the guide rail 200, along which the working direction AR is oriented, between rear end face 207 in the working direction AR and a front end face 208 in the working direction AR. The saw tool 15 can plunge into the workpiece W past the long narrow side 204.

Furthermore, a counter guide contour 206 in the form of a longitudinal rib and optionally a receptacle groove 205 extend in parallel to the longitudinal axis LS. The receptacle groove 205 is used, for example, to accommodate aids, clamping devices for clamping the guide rail 200, or the like. The longitudinal rib or guide contour 206 protrudes upward from the guide surface 202 and is used to engage in a guide contour 216 on the guide surface 19 of the guide body 18. The guide contour 216 is designed, for example, as an elongated receptacle groove 217 extending along the longitudinal axis L of the guide body 18.

An alternative embodiment of the guide rail 200 is schematically shown, for example, in the form of the guide rail 200A. The guide rail 200A has an engaging-behind projection 210, which protrudes from the guide surface 202 and from which at least one engaging-behind leg 211, preferably two engaging-behind legs 211 opposite to one another, laterally protrude transversely, and form a T-shaped structure, for example. The engaging-behind legs 211 engage in a receptacle 220 optionally provided on the guide surface 19, which has engaging-behind receptacles 221. For example, in the plane of the guide surface 19, support legs 222 protrude in the direction of the receptacle 220, behind which the engaging-behind legs 211 can engage, which engage in the engaging-behind receptacles 221. The guide device 17 is thus held in a force direction perpendicular to the guide surface 18 on the guide rail 200A, but at the same time is displaceable along the working direction AR on the guide rail 200A, however. The receptacle 220 and the engaging-behind projection 210 have an elongated form and extend in the direction of the longitudinal axes L or LS.

The guide body has a long side referred to hereinafter as the tool long side 18A, on which the saw tool 15 is arranged, and a so to speak tool-free long side 18B, which extends in parallel to the long side 18A and, like this, extends between a front and a rear end face 18C, 18D of the guide body 18.

The saw assembly 11 is arranged on an upper side 19A of the guide device 17 or the guide body 18 opposite to the guide surface 19. The guide body 18 is formed, for example, by a guide plate or is platelike. While the guide surface 19 is essentially a planar surface, except for receptacle contours arranged thereon, in particular, for example, the receptacle 220 and/or guide contour 216, the upper side 19A can bear functional components and/or can be reinforced by a rib structure. Inter alia, it is possible that an operator grasps and/or actuates the upper side 19A to guide the handheld machine saw 10, in particular in the region of a handle part 18F to the front end face 18C, for example, to apply a force direction perpendicular to the guide surface 19 in the direction of the workpiece W or the guide rail 200 to the front section of the guide body 18. The handle part 18F can be or comprise, for example, a planar surface. The handle part 18F advantageously has a recessed grip. However, the handle part 18F can also comprise a grip element 218, for example, a rod-shaped or toggle-shaped handle.

The saw assembly 11 as a whole is applied in the direction of the upper depth setting position OT by means of a saw assembly spring arrangement 20. The saw assembly spring arrangement 20 comprises, for example, a coiled spring 20A. The coiled spring 20A or spring assembly 20 supports itself, on the one hand, on the upper side 19A of the guide device 17, on the other hand, on the lower side of the saw assembly housing 13.

In addition to the depth adjustability around the depth setting axis TS, the saw assembly 11 can also be pivoted around a miter axis G.

The handheld machine saw 10 has a carrier 40. The carrier 40 comprises a protective housing 29. The saw assembly 11 is held on the carrier 40.

The carrier 40 and/or the protective housing 29 is pivotably mounted on the guide device 17 around the miter axis G, which extends in parallel to the longitudinal axis L of the guide device 17, namely by means of a front miter bearing 21 in the working direction AR and a rear miter bearing 23 in the working direction AR of a miter bearing arrangement 21A. The miter bearings 21, 22 are arranged close to or immediately at the front and rear end faces 18C, 18D of the guide body 18, thus so to speak form the frontmost and rearmost component of the handheld machine saw 10 in the working direction AR.

The miter bearings 21, 22 each comprise a bearing base 23, in particular like a plate, which protrudes upward from the upper side 19A of the device 10, and on which a bearing body 24, preferably also designed as a plate, is pivotably mounted around the miter axis G.

The miter bearings 21, 22 are fixable in multiple pivot positions with respect to the miter axis G by means of fixing means 25. The fixing means 25 comprise, for example, a clamping screw 25A, which can be applied to the bearing base 23 and the bearing body 24 toward one another into a clamping position, so that they are held against one another in a friction-locked and/or frictional and/or formfitting manner, for example, by means of intermeshing teeth, and fix the carrier 40 in a set angle position with respect to the miter axis G on the guide device 17.

Alternatively to the concept of the carrier 40, on which the saw assembly 11 and the scoring assembly 31 are arranged, to be rotatable simultaneously around the miter axis G by means of the miter bearing arrangement 21A, a concept is also possible in which the scoring assembly 31 can pivot independently of the saw assembly 11 around the miter axis G. For this purpose, for example, a miter bearing 22A is provided between a scoring assembly 31A, corresponding to the scoring assembly 31, and the saw assembly 11, as in the exemplary embodiment of the handheld machine saw 10A according to FIG. 5. Of course, it is advantageous if this miter bearing 22A is also fixable by a fixing means 25 like the miter bearings 21, 22, for example by a clamping screw, so that the relative position of the saw assembly 11 and the scoring assembly 31 is fixable with respect to the miter axis G.

However, the embodiment according to FIG. 5 can also provide that the saw assembly 11 can pivot around the miter axis G, but the scoring assembly 31A is arranged fixed in place with respect to the guide device 17 with respect to the miter axis G. The miter bearing 22A is also advantageously provided between the scoring assembly 31 and the saw assembly 11 in this case.

The carrier 40 comprises the protective housing 29 having a saw tool receptacle space 48 for accommodating the saw tool 15. The saw tool 15 is accommodated in a pivotably movable manner in the saw tool receptacle space 48 so it is pivotable around the depth setting axis TS, wherein it does not protrude from the saw tool receptacle space 48 in the upper depth setting position OT, but protrudes a maximum distance in front of the protective housing 29 and the guide surface 19 in the lower depth setting positions, for example the lowermost depth setting position UT.

The saw toolholder 14 is rotationally driven by the saw drive motor 12 around a tool axis of rotation DS with a rotational direction such that the saw tool 15 cuts into the workpiece W from its lower side WU and creates a saw cut SAE. The saw tool 15 is a saw blade, the teeth of which are inclined and driven in a rotational direction toward the guide surface 19, so that the teeth can result in cracking upon exiting from the workpiece upper side WO. To prevent this problem, the handheld machine saw 10 has a scoring module 30.

The scoring module 30 comprises a scoring assembly 31, which is arranged in front of the saw assembly 11 in the working direction AR. The scoring assembly 31 is arranged, like the saw assembly 11, on the carrier 40. A scorer drive motor 32 drives a scorer toolholder 34 around a tool axis of rotation DV, but with an opposite rotational direction in comparison to the rotational direction of the tool axis of rotation DS. The scorer drive motor 32 forms a scorer drive 32A.

A scoring tool 35, for example, a scorer saw blade, is detachably fastenable on the scorer toolholder 34, in particular by means of a holding element 34A, in particular a holding screw. The scoring tool 35 is driven in a rotational direction such that its teeth cut into the workpiece W from its workpiece upper side WO and create a score RI, which is aligned with a saw cut subsequently produced by the saw tool 15 in the workpiece W. The score is somewhat wider than the later saw cut, so that the saw tool 15 is not tangent to the longitudinal edges of the score and thus no or less cracking, no or less tearing out of chips or the like occurs on the workpiece upper side WO.

A scoring assembly housing 33 is arranged on the carrier 40, in which essential components of the scoring assembly 31 are accommodated in a protected manner. The scoring assembly housing 33 is therefore fixed in place with respect to the carrier 40 and also with respect to the protective housing 29, while the movable components of the scoring assembly 31, inter alia, the scorer drive motor 32, a gearing between the scorer drive motor 32 and the scorer toolholder 34, etc., are movably accommodated in the interior of the scoring assembly housing 33. The scorer drive motor 32 is advantageously accommodated in a motor housing 33A separate from the scoring assembly housing 33. The motor housing 33A is movable relative to the scoring assembly housing 33.

The scoring assembly 31 comprises a scorer carrier 80, which is mounted by means of a scorer depth setting bearing 36 around a depth setting axis TV on the carrier 40. The scorer toolholder 34 is also accommodated in the interior of the protective housing 29, namely in a scoring tool receptacle space 49 thereof.

The scorer carrier 80 has, for example, a block-like or cuboid design. The scorer carrier 80 has, for example, an elongated form. A longitudinal axis of the scorer carrier 80 or the scorer carrier 80 as a whole is inclined obliquely at a flat angle, for example, with respect to the guide surface 19 in dependence on his respective pivot position with respect to the depth setting axis TV or in some pivot positions is parallel to the guide surface 19 with respect to the depth setting axis TV.

The scorer carrier 80 comprises a bearing section 81 on mutually opposing longitudinal end regions, which is mounted on the scorer depth setting bearing 36 around the depth setting axis TV, and a motor section 82 having a motor receptacle 83, on which the scorer drive motor 32 is held. A gearing 84 can be arranged between the scorer drive motor 32 and the scorer toolholder 34, for example, a stepped gearing or the like. For example, it is possible that due to the gearing 84, the tool axis of rotation DV and a motor axis of rotation DM of the scorer drive motor 32 have a transverse distance in relation to one another. For example, the motor axis of rotation DM has a greater distance to the guide surface 19 than the tool axis of rotation DV, which is thus very close to the guide surface 19. It is thus possible, for example, that the scorer drive motor 32 has a greater diameter for generating a correspondingly greater torque than in a design in which its motor axis of rotation and the tool axis of rotation DV are aligned with one another.

To actuate the saw toolholder 14 between the upper depth setting position OT and one of the lower depth setting positions UT, the saw assembly 11 as a whole is to be pivoted around the depth setting axis TS. For this purpose, an operator can grasp, for example, handles 26 and/or 27 arranged on the saw assembly housing 13. The handle 26 is arranged at the rear on the saw assembly 11 in the working direction AR, the handle 27 is arranged at a front region of the saw assembly housing 13 on the saw assembly 11 in the working direction AR. Both handles 26, 27 have an elongated form. The handle 26 as a longitudinal axis L 26, which extends essentially in parallel to the longitudinal axis L of the guide device 17, while a longitudinal axis L27 of the handle 27 extends transversely to this longitudinal axis L. The operator can thus, for example, generate a torque around the depth setting axis TS by pressing on the handle 27, whereby the saw toolholder 14 pivots around the depth setting axis TS and the saw tool 15 is moved in front of the guide surface 19.

The handle 27 simultaneously forms an actuating element 27A, using which an operator not only can actuate the saw assembly 11 or the saw toolholder 14 between its depth setting positions, but moreover also the scoring assembly 31. The actuating element 27A, thus an actuating handle 27B, acts via a driving device 70 on the scoring assembly 31 for its adjustment between an active position AP, in which the scoring tool 35 protrudes in front of the guide surface 19, and an inactive position IP, in which the scoring tool 35 is adjusted behind the guide surface 19 or in any case does not protrude in front of it.

The scorer carrier 80 and thus the scorer toolholder 34 is loaded by a scoring assembly spring arrangement 39 in the direction of the inactive position IP. In contrast, in the opposite direction, thus in the active position AP, the driving device 70 carries along the scoring assembly 31 when the saw assembly 11 is actuated from the upper depth setting position OT in the direction of the lower depth setting position UT. Upon adjustment of the handheld machine saw 10 into a lower depth setting position or sawing position, an operator thus so to speak operates against the two spring arrangements 20, 39 to adjust both the saw tool 15 and also the scoring tool 35 into a working position or sawing position engaging in the tool W. In the opposite direction, so to speak into the inactive position or secure position, the two spring arrangements 20, 39, which both act in a safe sense, namely in a sense to adjust the saw tool 15 and the scoring tool 35 behind the guide surface 19.

The driving device 70 comprises an actuation generator 71 on the saw assembly 11, which acts on an actuation acceptor 72 of the scoring assembly 31. The actuation generator 71 is designed as a link guide 73 and comprises a guide link 74, along which a link follower 75, for example a roller or touch roller, of the scoring assembly 31 is guided, for example rolls along. The actuation generator 71 and the actuation acceptor 72 are advantageously arranged outside the protective housing 29.

The guide link 74 comprises a scorer activation section 76 and a scorer holding section 77, between which a vertex 76A is arranged. The scorer holding section 77 of the guide link 74 or link track extends in a radius R around the depth setting axis TS. The scorer activation section 76, in contrast, extends at an angle to the scorer holding section 77 in any case in such a way that the link follower 75 guided along the holding section 77 actuates the scoring assembly 31, in particular the scorer carrier 80, in a direction that the scorer toolholder 34 and thus the scoring tool 35 is actuated out of the inactive position IP along a movement path BB in the direction of the active position AP.

The scorer activation section 76 is designed in such a way that upon an adjustment of the saw toolholder 14 out of the upper depth setting position OT in the direction of the lower depth setting position UT, the scoring tool 35 is adjusted leading in front of the saw tool 15 out of the inactive position IP into the active position AP, in which it protrudes in front of the guide surface 19 with a preferably settable maximum penetration depth or scoring depth Rmax to engage in the workpiece W. The scoring depth RMax or the active position AP is already set or settable when the saw tool 15 or the saw toolholder 14 or the saw assembly 11 assumes a depth setting position RT, in which the saw tool 15 does not yet protrude in front of the guide surface 19. This setting of the handheld machine saw 10 relates to solely scoring operation or scorer operation, in which only the scoring assembly 31 or scoring tool 35 is used to introduce a score into the workpiece W.

In order that the operator does not have to so to speak balance out the saw assembly 11 in the depth setting position RT by hand in this solely scoring operation or scoring unit operation, an only-scoring depth stop device 78 is provided. This comprises a stop element 79 movably mounted on the saw assembly 11, for example movable by sliding, which is adjustable between a stop position TA, in which it stops on a counter stop 79A, which is arranged on the protective housing 29, and a release position TF, in which the stop element 79 is movable past the counter stop 79A, to actuate the saw assembly 11 and thus the saw toolholder 14 out of the scorer depth setting position RT farther in the direction of one of the lower depth setting positions UT, in which the saw tool 15 protrudes in front of the guide surface 19 to cut into the workpiece W. For example, the stop element 79 is displaceably mounted transversely to the longitudinal axis L on the motor housing part 28 or saw assembly housing 13.

The stop element 79 is advantageously arranged close to the handle 26, in particular at its upper region most remote from the guide device 17, so that an operator grasping around the handle 26 can actuate the stop element 79 with his thumb in a slide guide (not designated in greater detail) between the stop position TA and the release position TF.

Furthermore, a main switch actuating element 60 for actuating a main switch 60A, using which the saw drive motor 12 and the scorer drive motor 32 can be switched on and switched off, is arranged at this upper region of the handle 26 or region most remote from the guide device 17.

The handheld machine saw 10 is connectable, for example, by means of an attachment line 67 to an electrical power supply grid, for example an AC voltage grid at 120 V, 230 V, or the like, for the electrical power supply of the drive motors 12, 32 and other electrical components of the handheld machine saw 10.

Alternatively or additionally to the supply via an electrical power supply grid, for example, an electrical energy storage device 67D, for example an accumulator, can also be provided for the power supply of the saw assembly 10 and/or the scoring assembly 31.

For the power supply of the scoring assembly 31 by the saw assembly 11, a connecting line 68 is provided. The connecting line 68 is connected using attachment sections 68A, 68B at its longitudinal ends, on the one hand, to the saw assembly 11, on the other hand, to the scoring assembly 31. An arc-shaped connecting section 68C or arc section extends between the attachment sections 68A, 68B.

However, it is also possible that the scoring assembly 31 can be supplied with electrical energy by means of an electrical energy storage device 68D arranged, for example, on or in the scoring assembly housing 33.

The connecting section 68C extends starting from the longitudinal ends 68A, 68B in an arc shape in the direction of the protective housing 29, so that an intermediate space is provided between the longitudinal lens 68A, 68B, which is optimally suitable for operating components of the scoring assembly 31.

In particular, a scorer handle body 37 is accessible through the intermediate space between the attachment sections 68A, 68B or the interior of the connecting section 68C, using which an operator can exert an actuating force in the direction of the guide surface 19 in the region of the scoring assembly 31. The scorer handle body 37 has a handle surface 37A, which is provided in particular on a cover wall 38 of the scoring assembly housing 33. This is because the scoring assembly housing 33 forms the scorer handle body 37.

A recessed grip 37B and a planar surface 37C are provided on the handle surface 37A. A handle bulge 37D extends above the recessed grip 37B, which has, for example, an outer circumferential contour matching with the palm of an operator.

The housing 33 furthermore has a side wall 38A, which extends adjacent to the long side 18B of the guide body 18, and a front wall 38B, which extends in parallel to the front end face 18 of the guide body 18.

Since the housing 33 of the scoring assembly 31 is fixedly arranged on the carrier 40, it does not pivot around the depth setting axis TV, but is pivot-fixed with respect to the depth setting axis TV. To guide the handheld machine saw 10 in the working direction AR, an operator can thus support himself on the housing 33, in particular its cover wall 38, and exert a force in the direction of the guide surface 19 and/or in the working direction AR on the handheld machine saw 10. The housing 33 has a support part 38D for support on the upper side 19A of the guide body 18.

The housing 33 is advantageously designed ergonomically favorably. For example, the cover wall 38 is inclined obliquely to the rear at a small angle with respect to the working direction AR, so that the operator can exert an operating force in the working direction AR toward the front on the housing 38 and thus the handheld machine saw 10. The cover wall 38 or the housing 33 advantageously has a handle bulge 38C. The handle bulge 38C is also suitable for the purpose of accommodating the scorer drive motor 32 beneath it. The operator can support himself on the handle bulge 38C or grasp around it, for example, with his palm. A particularly ergonomic operating concept thus results.

Figure 28:
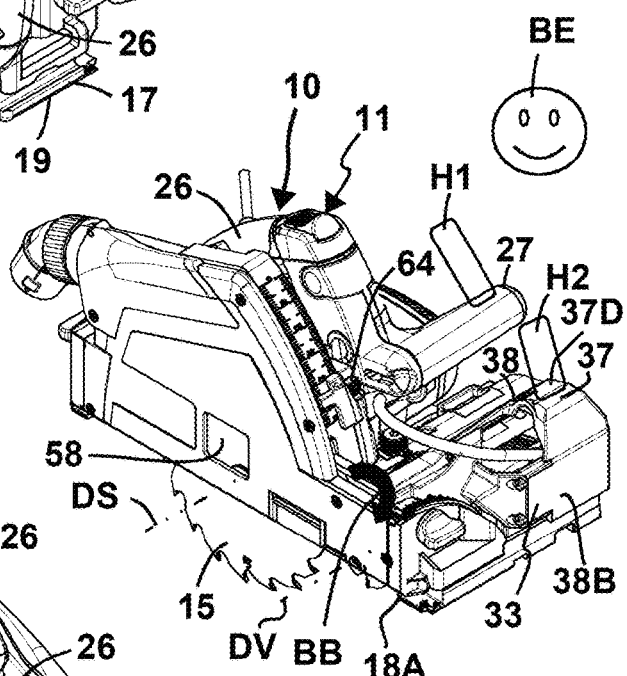
FIG. 28 shows the handheld machine saw according to FIG. 27 diagonally from the front.
Figure 29:
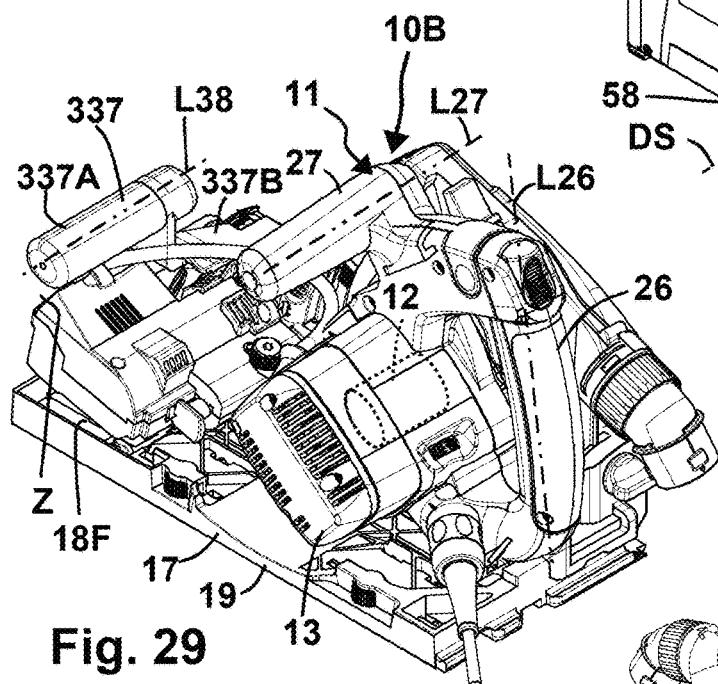
FIG. 29 shows a variant of the handheld machine saw according to FIG. 27 having an additional scorer handle body.
Figure 30:
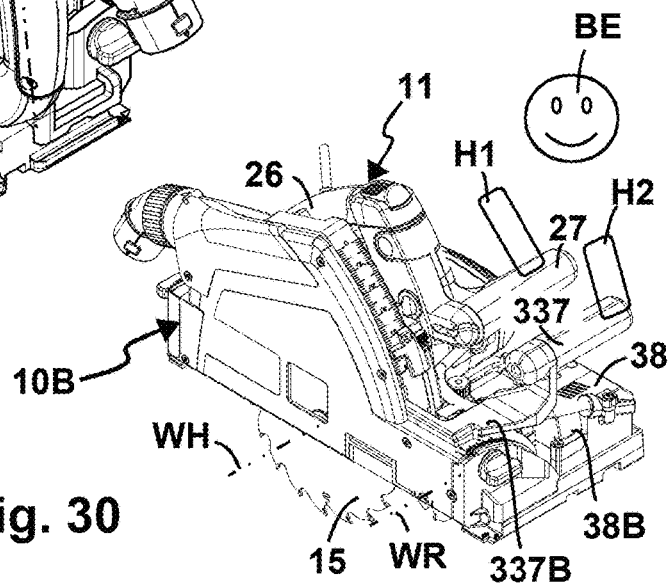
FIG. 30 shows the handheld machine saw according to FIG. 29 diagonally from the front.

A schematically indicated operator BE can thus, for example, grasp around the handle 26 with a hand to guide the handheld machine saw 10, in order to also actuate the main switch 60 and the actuating element 61A with his hand, and with his other hand to optionally either grasp the handle 27, which is shown as a hand position H1 in FIG. 28, or can support himself on the scorer handle body 37 or housing 38, which is shown as the hand position H2.

An alternative operating concept or an operating concept provided in addition to the handle 37 provides an additional scorer handle body 337. The handle body 337 is, for example, rod-shaped and has a handle surface 337A to be grasped around by the operator BE. The handle body 337 is fastened by means of a carrier 337B on the protective housing 29 and protrudes from it in the direction of the scoring assembly 31.

The scoring assembly 31 is arranged between the handle body 337 and the guide body 18, wherein an intermediate space Z, through which an operator can grasp around the handle body 337, is provided between the handle body 337 and the upper side of the housing 33 of the scoring assembly 31 facing away from the guide body 18.

Both handle bodies 37 and 337 extend along a longitudinal axis L38 transverse to the longitudinal axis L of the guide body 18, in particular perpendicularly transverse. Both handle bodies 337 and 37 preferably extend up to the so to speak tool-free long side 18B of the guide body 18. Both handle bodies 37 and 337 preferably extend over essentially the entire transverse width of the guide body 18 from the long side or narrow side 18B in the direction of the long side 18A, on which the tools 15, 35 are arranged, so that they provide the operator with an ergonomic support for guiding the handheld machine saw 10.

Furthermore, the saw assembly 11 or the saw toolholder 14 is lockable by means of a locking device 61 in the upper depth setting position OT. An actuating element 61A of the locking device 61, designed, for example, as a pressure actuating element, is arranged on the upper region or region most remote from the guide device 17 of the handle 26. By actuation of the actuating element 61A, it can be disengaged from a buttress contour 61B, for example engaging-behind contour, so that the saw assembly 11 is unlocked for adjustment from the upper depth setting position OT into one of the lower depth setting positions UT or the scoring depth setting position RT.

The scoring depth setting position RT and other lower depth setting positions UT are also settable by means of a saw depth setting device 62 of the handheld machine saw 10. The saw depth setting device 62 comprises a depth stop guide 63, which extends in an arc shape around the saw depth setting bearing 16.

It is advantageous if the guide link 74, which also extends in an arc shape around the depth setting axis TS at least in the region of the scorer activation section 76, is arranged adjacent to the depth stop guide 63.

A depth stop 64 is adjustably mounted in various depth setting positions, for example displaceably, on the depth stop guide 63. The depth stop guide 63 comprises, for example, a guide groove, a guide slot, or the like. The depth stop 64 is fixable in place with respect to the depth stop guide 63 by means of a fixing unit 65, for example a detent fixing unit.

A stop body 66 is arranged on the saw assembly 11 movable around the depth setting axis TS, which protrudes in the direction of the depth setting stop 64 and stops thereon in the respective depth setting position set by it.

The scoring assembly 31, in particular its scorer carrier 80, is pivotably mounted on the carrier 40 pivotable around the miter axis G around the depth setting axis TV by means of the scorer depth setting bearing 36. The scorer depth setting bearing 36 comprises a bearing base 86, which is fastened on the carrier 40. The bearing base 86 comprises a support plate 86A, for example a flange or flange body, from which an axis element 86B protrudes. The support plate 86A is fastened using screws 86C on a base wall 29A of the protective housing 29, so that the axis element 86B protrudes from the base wall 29A.

A bearing sleeve 86E is arranged on the outer circumference of the axis element 86B, on the outer circumference of which a bearing element 86F is in turn arranged. The bearing sleeve 86E thus engages in a bearing receptacle of the bearing element 86F, so that the bearing element 86F is pivotably mounted by means of the bearing sleeve 86E around the depth setting axis TV. The bearing element 86F is, for example, fixedly connected to the scorer carrier 80, for example accommodated in a receptacle thereof.

The bearing sleeve 86E represents an option which improves the ability to rotate or pivot around the depth setting axis TV. Moreover, the bearing sleeve 86E improves a longitudinal displaceability of the scorer carrier 80 and thus of the scoring assembly 31 with respect to a transverse adjustment axis QS, in order to align the scorer toolholder 34 with respect to the saw toolholder 14 and thus the scoring tool 35 with respect to the saw tool 15 in an axial line aligned with one another, so that the score produced by the scoring tool 35 aligns with the saw cut produced by the saw tool 15. It is advantageous that the transverse adjustment axis QS simultaneously corresponds to the depth setting axis TV.

A transverse adjustment device 87 is used to adjust the scorer toolholder 34 with respect to the transverse adjustment axis QS. The transverse adjustment device 87 comprises as a positioning element 87A, for example, a positioning screw, the head of which represents an actuating element 87B. A ribbing or similar other handle which facilitates the operation for the operator BE can be provided on the radial outside, for example, on the actuating element 87B. A screw section 87C engages in a positioning receptacle 86D of the axis element 86B and is screwed together therewith. Therefore, by rotating the positioning screw or the positioning element 87A, the position of the actuating element 87B can be adjusted along the transverse adjustment axis QS. The screw section 87C is thus so to speak screwed into the positioning receptacle 86D or unscrewed from it.

The actuating element 87B protrudes in front of the axis element 86B with a projection protruding radially in front of the transverse adjustment axis QS, for example a flange projection, so that the bearing sleeve 86E and/or the bearing element 86F can support itself on this projection. The actuating element 87B thus carries along the bearing element 86F as the screw section 87C is screwed into the positioning receptacle 86D in the direction of the support plate 86A of the bearing base 86 along the transverse adjustment axis QS and thus adjusts the scorer toolholder 34 in a direction away from the tool long side 18A of the guide body 18.

A spring 86H acts opposite to this positioning direction, which supports itself on one side on the support plate 86A and on the other side on the bearing element 86F and thus acts with a force in the direction toward the actuating element 87B. The spring 86H engages in a spring receptacle 86G of the bearing element 86F, which is designed, for example, as a circumferential groove that extends around the transverse adjustment axis QS. The spring 86H is penetrated by the bearing element 86F, the bearing sleeve 86E, and the axis element 86B.

By rotating the actuating element 87B around the transverse adjustment axis QS, the position of the scorer toolholder 34 and thus of the scoring tool 35 is adjustable with respect to the longitudinal axis L of the guide body 18 and/or a cut axis producible by the saw tool 15 in directions opposite to one another with respect to the transverse adjustment axis QS, for example, out of a middle location by at most 2.5 to 4 mm in each direction.

A detent device 88 is used for fixing, in particular rotationally fixing, the actuating element 87B or the positioning element 87A. The detent device 88 comprises a clamp-like spring 88A or alternatively 188A, on the free ends of which detent elements 88B are formed. The detent springs 88B, 188B engage in detent receptacles 88C in a locking manner, which are arranged on the radial outer circumference of the actuating element 87B with respect to the transverse adjustment axis QS. By rotating the actuating element 87B, the detent elements 88B move out of the one detent receptacle 88C and engage in the closest adjacent detent receptacle 88C in the circumferential direction. The detent device 88 thus fixes the transverse adjustment device 87 with respect to a respective set transverse setting of the scorer toolholder 34.

The actuation acceptor 72 is arranged on an actuation acceptor arm 90, namely on its free end region. A pivot bearing 90A for a wheel 90B is arranged there, which can rotate around an axis of rotation D90 by means of the pivot bearing 90A at the free end region of the actuation acceptor arm 90 and represents the link follower 75. The wheel 90 can thus roll along the guide link 74.

The actuation acceptor arm 90 is pivotably mounted using a bearing section 91 around a pivot axis, which corresponds to the depth setting axis TV in the present case, with respect to the scorer carrier 80 of the scoring assembly 31, so that the link follower 75 has a different angle positions in dependence on the pivot position of the actuation acceptor arm 90 with respect to the depth setting axis TV or with respect to the scorer carrier 80, so that by pivoting the actuation acceptor arm 90 with respect to the scorer carrier 80, different penetration depths of the scoring tool 35 into the workpiece W or different distances at which the scoring tool 35 protrudes in front of the guide surface 19 in the active position AP are settable. The actuation acceptor arm 90 therefore forms a component of scorer depth setting means 95.

An actuating arm 92 protrudes at an angle from the actuation acceptor arm 90 from the bearing section 91. An actuating surface 92A is provided on the actuating arm 92, on which a positioning body 93 acts. By adjusting the relative position of the positioning body 93 with respect to the actuating surface 92A, the actuation acceptor arm 90 and thus the link follower 75 can be adjusted in such a way that it has different actuation distances BA to the scorer toolholder 34. This is because the link follower 75 and thus the actuation acceptor 72 and the scorer toolholder 34 protrude like arms from the bearing section 81 of the scorer carrier 80 on mutually opposing sides.

The positioning body 93 supports the actuating arm 92 against the force of a spring arrangement 94. The spring arrangement 94 comprises a coiled spring 94A, which is secured on one side on the scorer carrier 80 and on the other side on the actuation acceptor arm 90 and impinges it in a direction toward the carrier 90 or the scorer toolholder 34. In contrast, the positioning body 93 acts in the opposite direction, thus in the direction of an adjustment of the actuation acceptor arm 90 from the scorer carrier 80 and thus in the direction of enlarging the actuation distance between the actuation acceptor 72 and the scorer toolholder 34.

The positioning body 93 is displaceably mounted with respect to the scorer carrier 80 along an axis SA. Moreover, the positioning body 93 is displaceably mounted transversely to the axis SA, in the present case perpendicularly transversely, along an axis SB, wherein this degree of movement freedom is assigned to the scorer depth setting means 95.

The positioning body 93 has a longitudinal end 93A, on which a positioning surface 93B is arranged to engage with the actuating surface 92A of the actuating arm 92. A middle section 93C of the positioning body 93, on which it has a positioning contour 93D, extends between the longitudinal end 93A and an actuating end 93B.

The positioning body 93 is displaceably mounted with respect to the positioning axis SA on a bearing body 96 designed, for example, as a housing. For example, the bearing body 96 has bearing receptacles 96A, 96C, which are arranged on walls or bearing sections 96B, 96D of the bearing body 96. The middle section 93C of the positioning body 93 extends between the bearing receptacles 96A, 96C, wherein the positioning body 93 protrudes on mutually opposing sides in front of the bearing body 96, namely on one side with the positioning surface 93B, which is engaged with the actuating surface 92A of the actuating arm 92, and on the other side with an actuating end or actuating element 93E, on which a grip surface or similar other positioning surface for actuation by an operator is arranged.

Specifically, for example, an operator can pull on the actuating element 93E in the direction of the positioning axis SA, whereby the positioning body 93 is disengaged from the actuating surface 92A, so that the spring arrangement 94 can actuate the actuating arm 90 out of an activation position AK away from the guide link 74 into a deactivation position DK. In the deactivation position DK, the link follower 75 is disengaged from the guide link 74 and has, for example, a distance F to guide link 74 (FIG. 7), so that the driving coupling of the driving device 70 between the saw assembly 11 and the scoring assembly 31 is canceled. The saw assembly 11 can thus be adjusted between its depth setting positions OT and UT, without the scoring assembly 11 being adjusted around the depth setting axis TV. The scoring tool 35 remains adjusted behind the guide surface 19, thus inactive.

The positioning body 93 thus forms a component of a deactivation device 97 for deactivating or activating the driving device 70.

The positioning body 93 is loaded by a spring 96E in its activation position AK. The spring 96E supports itself, for example, on the positioning body 93, for example, on a step close to the center section 93C, and on the wall 96D of the bearing body 96.

At the actuating end or actuating element 93E, a rotation lock 93F fixed in place with respect to the scorer carrier 80 is preferably provided, for example, a planar surface, on which the actuating end 93F is supported in a non-rotatable manner with respect to the positioning axis SA.

The positioning contour 93D forms a component of the scorer depth setting means 95. The positioning contour 93D of the positioning body 93 arranged on the radial outer circumference of the middle section 93C is engaged with a positioning receptacle 98, the position of which is adjustable along the positioning axis SB and thus transversely to the positioning axis SA by means of a depth setting element 99, for example a positioning screw. An operator can actuate the depth setting element 99 by means of an actuating element 99A.

Alternatively, it would be possible that the positioning body 93 is pivotably mounted around the positioning axis SA and the positioning contour 93D represents an eccentric contour, so that by pivoting the positioning body 93 around the positioning axis SA, parts of the positioning contour 93D protruding different distances radially in front of the positioning axis SA are supported on the positioning receptacle 98 and thus the positioning surface 93B of the positioning body 93 assumes different positions with respect to the positioning axis SB.

The depth setting element 99 comprises, for example, an actuating element 99A, for example a head, from which a screw section 99B protrudes, which is rotatably mounted on a component fixed in place with respect to the scorer carrier 80, for example the bearing body 96, and is screwed into a body 98A providing the positioning receptacle 98.

By way of a screw actuation of the depth setting element 99, a transverse position of the positioning receptacle 98, which is U-shaped, for example, is adjustable transversely to the positioning axis SA, for example, along a positioning axis SB, whereby the position of the positioning surface 93B and thus the actuating surface 92A of the actuating arm 92 pressing thereon is adjusted transversely to the positioning axis SA at the same time.

The positioning body 93 is accommodated displaceably along the positioning axis SA in the positioning receptacle 98, so that the scorer depth setting means 95 maintain the respective set depth setting position, even if the deactivation device 97 is actuated, in that the positioning body 93 is displaced along the positioning axis SA.

An intermediate space 33B is provided with respect to the longitudinal axis L of the guide device 17 or the guide body 18 between the scoring assembly housing 33 forming a scorer handle body 37 and the saw assembly housing 13, in which one or more actuating elements of the scoring assembly 31 provided for actuation by an operator are conveniently accessible for the operator, for example, the actuating element 93E of the deactivation device 97, the actuating element 87B of the transverse adjustment device 97, or the actuating element 99A of the scorer depth setting means 95.

The handheld machine saw 10 is short with respect to the longitudinal axis L of its guide body 18, thus between the end faces 18C, 18D. This is achieved, inter alia, by the compact scoring module 30 or scoring assembly 31. Furthermore, it is advantageous that the depth setting axis TV is arranged between the toolholders 14 and 34. The handheld machine saw 10 is therefore not so to speak top-heavy in its front region in the working direction AR, but rather extremely short.

The arrangement of the toolholders 14, 34 and thus of the saw tool 15 and the scoring tool 35 close to or directly at the long side 18A of the guide body 18 also contributes to the user-friendliness of the handheld machine saw 10. Inter alia, the two tools 15, 35 are thus well visible at their penetration region into the workpiece W. Moreover, the miter axis G extends directly adjacent to the long side 18A, so that the tools 14, 35 can pivot optimally around this long side 18A, but also around the long narrow side 204 of the guide rail 200, 200A.

Furthermore, an advantageous suction concept for dust, particles, and the like, which arise during the sawing and scoring of the workpiece W, is ensured in the handheld machine saw 10:

The saw tool receptacle space 48 and the scoring tool receptacle space 49 are provided with a sawdust removal device 48A and a scorer dust removal device 49A. The receptacle spaces 48, 49 extend up to the guide surface 19, where the saw tool 15 protrudes in one of the lower depth setting positions UT and the scoring tool 35 protrudes in its active position AP out of the respective receptacle space 48, 49 in front of the guide surface 19. The dust removal devices 48A, 49A are arranged in a flow connection with a dust removal fitting 52, which is arranged at the rear in the working direction AR on the handheld machine saw 10, in particular on the top rear of the protective housing 29. A suction hose SL of a suction device SV, for example, a workshop suction unit, is connectable to the dust removal fitting 52, which is designed, for example, as a connecting piece, to suction off dust, particles, or the like arising during the sawing operation of the handheld machine saw 10.

The protective housing 29 has a protective housing part 40A, which is fixed in place with respect to the carrier 40, and which is covered by a protective housing cover 41 which is advantageously removable from the protective housing part 40A for maintenance purposes. The receptacle spaces 48, 49 for the top parts of the tools 15, 35 with respect to the guide device 17 are formed between the protective housing part 40A and the protective housing cover 41. The protective housing part 40A has, for example, a base wall 29A, which is opposite to a cover wall 42 of the protective housing cover 41.

A recess 42A is provided between the base wall of 29A and the cover wall 42, through which the tools 15, 35 are movable out of the protective housing 29, so that they protrude in front of the guide surface 19. An obliquely inclined wall section 42B of the cover wall 42 extends adjacent to the recess 42A, which is obliquely inclined in such a way that a transverse distance between the cover wall 42 and the base wall 29A is reduced in the region of the recess 42A and/or is less than in a region of the saw tool receptacle space 48 more remote from the guide surface 19, in which the saw tool receptacle 14 is arranged.

Angled side walls 43C, 43 and 44C, 44 protrude from the base wall 29A and the cover wall 42, which press against one another at the end faces and interlock, so that the side walls 43-44 delimit the receptacle spaces 48, 49. The side walls 43C, 43 are, for example, rear side walls in the working direction AR. The side walls 44C, 44 extend along an upper section or section most remote from the guide device 17 of the protective housing 29 and on a front section of the protective housing 29 in the working direction AR.

The protective housing 29 has a projection 45, in which the scoring tool receptacle space 49 is provided. The cover wall 42 extends up to the projection 45. A side wall 46 protrudes there from the cover wall 42 on a side facing away from the guide device 17 and a side wall 47 protrudes at an angle forward in the working direction, thus in orientation toward the end face 18C, which press at the end faces on the protective housing part 40A fixed in place with respect to the carrier 40, so that overall the projection 45 also provides a closed scorer receptacle space 49 toward the guide surface 19, except for a passage opening for the scoring tool 35.

It would be possible in principle to suction off the two receptacle spaces 48, 49 without further fluidic measures via the dust removal fitting 52. However, it is not considered here that the scoring tool 35, when it cuts into the workpiece upper side WO, throws particles toward the saw tool 15, which would significantly worsen a view of the front cutting edge of the saw tool 15 in the working direction AR. Several measures described hereinafter are advantageous to remedy these problems.

To suction off dust, particles, or the like, a dust removal duct 50 extends on a region of the protective housing 29 facing away from the guide device 17. The dust removal duct 50 is delimited, on the one hand, by the side walls 44, 44C, on the other hand by intermediate walls 51, 51C opposite thereto on the cover 41 or protective housing part 40A, respectively. The dust removal duct 50 extends from a front region of the saw tool 15 in the working direction AR to the dust removal fitting 52 arranged at the rear in the working direction AR.

It would be possible in principle that the scoring tool receptacle space 49 communicates directly with the dust removal duct 50. However, the saw tool receptacle space 48 is advantageously provided with a partition, namely in the form of a partition wall 55, from the scoring tool receptacle space 49 at least in that region where the saw tool 15 and the scoring tool 35 are directly opposite, namely close to the guide surface 19. The partition wall 55 advantageously has a partition wall part 55C fixed in place with respect to the protective housing 29, for example, the protective housing part 40A. The partition wall 55, in particular the partition wall part 55C, extends up to the guide surface 19 and thus stands between the saw tool 15 and the scoring tool 35.

On a side facing toward the scoring tool 35, the partition wall part 55C or the partition wall 55 advantageously has a flow guiding surface 55E, for example, inlet bevel or baffle 55D, on which the particles generated by the scoring tool 35 strike and are deflected in the direction of the dust removal duct 50, and thus do not continue to flow toward the saw tool 15.

At a region of the partition wall section 55C remote from the guide surface 19, the scoring tool receptacle space 49 opens at an outflow opening 52C into the dust removal duct 50, so that the particles generated by the scoring tool 35, which are indicated in FIG. 18 as a particle flow PV by black arrows, mix with a particle flow PS represented by white arrows, which contains particles generated by the saw tool 15.

An alternative concept, in which the above-mentioned partition wall 55 between scoring tool 35 and saw tool 15 is also advantageous and provided, is indicated in FIG. 21. However, the receptacle spaces 48, 49 are completely separated from one another therein and the scoring tool receptacle space 49 has a dust removal fitting 52B separate from the dust removal fitting 52 for removing the particles of the scoring assembly 31, to which a farther suction hose SL2 is connectable. For example, a connecting piece for connecting the suction hose SL2 is provided on the dust removal fitting 52B, which is also fluidically connected to the suction device SV, for example, to generate a particle flow PV conveying away particles of the scoring assembly 31. Via the dust removal fitting 52, the particles generated by the saw tool 15 flow as a particle flow PS separate from the particle flow PV to the suction device SV.

Formfitting contours 52A, for example rotational formfitting contours, plug-in formfitting contours, etc., are provided on the dust removal fittings 52, 52B for the formfitting hold of the suction hoses SL, SL2. Furthermore, it is advantageous if the dust removal fittings 52, 52B have pivot bearings 52D, so that the suction hoses SL, SL2 are rotatably mounted on the handheld machine saw 10.

Solely due to the arrangement of toolholders 14, 34 and thus the tools 15, 35 directly on the so to speak free long side 18A of the guide body 17, optimum visibility of these tools is already provided. A viewing window 54 on the cover wall 42, in particular on its lower edge region close to the guide surface 19, is furthermore advantageous.

The viewing window 54 is arranged on a region of the cover wall 42, where the scoring tool 35 is opposite to the saw tool 15. Both tools can thus be seen through the viewing window 54.

The viewing window 54 could be closed by a fixed, transparent wall, for example made of plastic, so that receptacle spaces 48, 49 would be closed by this wall. However, in the present case a cover element 53 is provided, in particular a window body or window cover element.

The cover element 53 has a saw tool section 53A and a scoring tool section 53B, which are assigned to the saw tool 15 or scoring tool 35, respectively, and are each opposite thereto, in any case when the cover element 53 is adjusted into a cover position ABS, in which it conceals the viewing window 54.

The cover element 53 is adjustable by means of a bearing 53D, in particular a slide bearing, on the cover wall 42 between the cover position ABS and an open position OS, in which it at least partially exposes the viewing window 54, in particular its section facing toward the guide surface 19. An actuating contour 53C, for example a rib or the like, is advantageously provided for grasping the cover element 53. The cover element 53 is adjustable by a sliding actuation in a direction P1 into its open position OS, and into its cover position ABS by a sliding actuation in a direction P2 opposite thereto.

The cover element 53 has a partition wall section 56 of the partition wall 55. The partition wall section 56 is engaged or in contact in the cover position ABS and in the open position OS telescopically or in such a way with the fixed partition wall section 55A that the partition wall 55 is so to speak closed. The partition wall section 56 has a partition wall receptacle 57 which comprises, for example, mutually opposing side walls 56A. The fixed partition wall section 55A can engage in the partition wall receptacle 57, wherein it engages deeper in the partition wall receptacle 57 in the open position OS than in the cover position ABS.

Furthermore, recesses 58, 59 are provided on the cover wall 42, through which the toolholders 14, 34 are accessible for a tool change of the tools 15, 35. It is to be mentioned here that the holding elements 14A, 34A advantageously have identical actuating contours, for example slots for screwdrivers, for a tool, using which the holding elements 14A, 34A can be released for a tool change and can be fixed on the toolholder 14, 34.

A blocking device 85 is provided for a tool change of the scoring tool 35. The blocking device 85 comprises a scorer blocking element 85A, which engages in a blocking receptacle 85B, which is connected in a rotationally-fixed manner to the scorer toolholder 34, for example is arranged on an output shaft of the gearing 84, in a blocking position. The blocking element 85A is axially displaceable on a guide 85C along a positioning axis S85. By pressing on an actuating contour 85D at a free end region of the blocking element 85A protruding in front of the guide 85C, an operator can engage the blocking element 85A with the blocking receptacle 85B, thus move it into a blocking position in which the scorer toolholder 34 is blocked in a rotationally-fixed manner. This blocking position can be canceled, for example, by pulling on the blocking element 85A in a direction away from the blocking receptacle 85B. A spring 85E, which is schematically shown in the drawing, is advantageously provided, which acts upon the blocking element 85A in a release position, in which the blocking element 85A does not engage in the blocking receptacle 85B.

Alternatively or additionally, a motorized drive 85F can also be provided, for example, an electromagnet, electrical linear drive, etc., using which the blocking element 85A is adjustable into the blocking position and/or the release position. For example, the drive 85F can be active in the blocking position, while the spring 85E acts in the release position. To switch the drive 85E, for example, an electrical switch 85G is provided, which is actuatable by the operator by pressure actuation or the like.

A securing device 100 is used for safe and convenient tool change of the saw tool 15 and/or scoring tool 35.

The securing device 100 disables the switch 60A against switching on of the drive motors 12, 32 when it is adjusted into its securing position SG and releases the switch 60A for switching on the drive motors 12, 32 when it is adjusted into a saw operation position FS. Both drive motors 12, 32 can thus be disabled simultaneously against switching on by the securing device 100 for a tool change.

Figure 31:
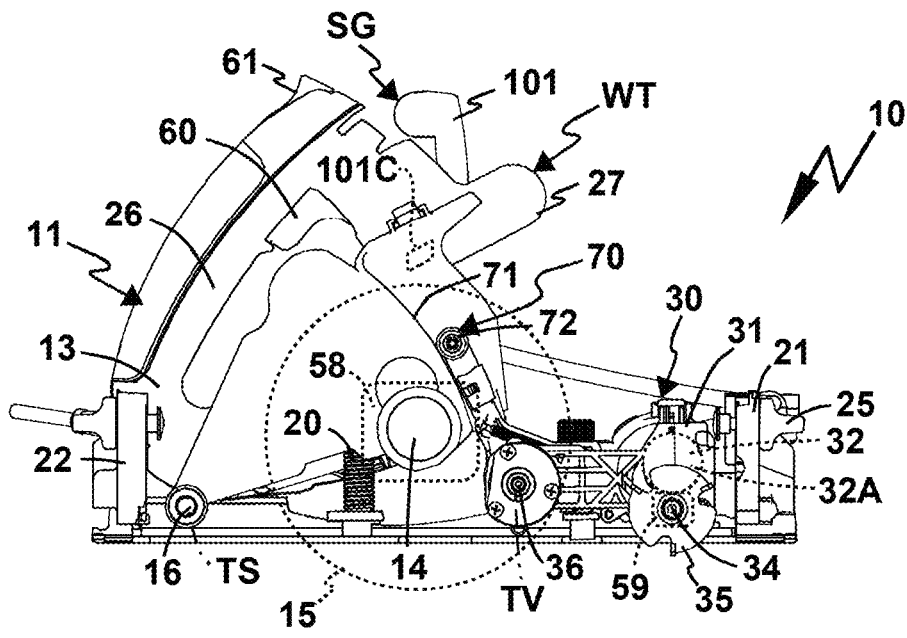
FIG. 31 shows a side view of the handheld machine saw according to the above figures having a securing device in a securing position.
Figure 32:
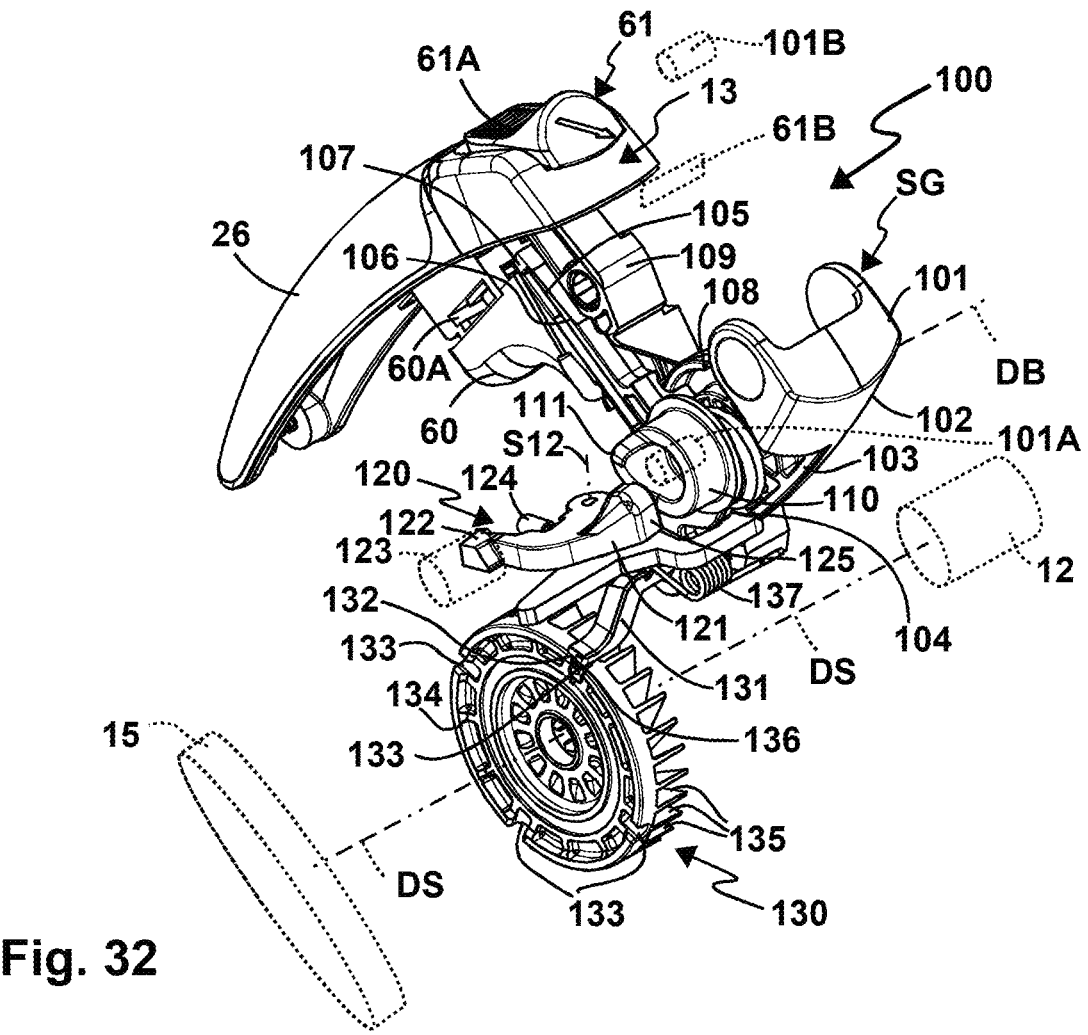
FIG. 32 shows a perspective diagonal view of the securing device of the handheld machine saw according to FIG. 31.
Figure 38:
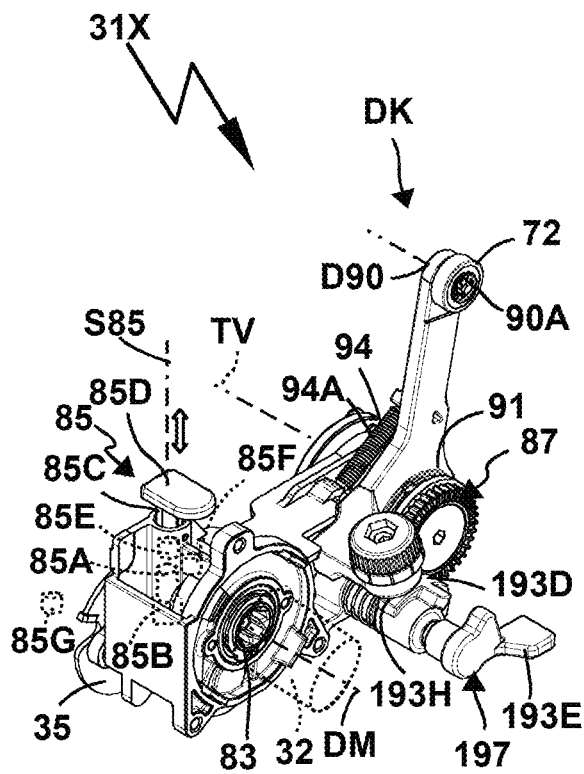
FIG. 38 shows a variant of the scoring assembly having alternative scorer depth setting means and an alternative deactivation device in a perspective diagonal view in a deactivation position.
Figure 39:
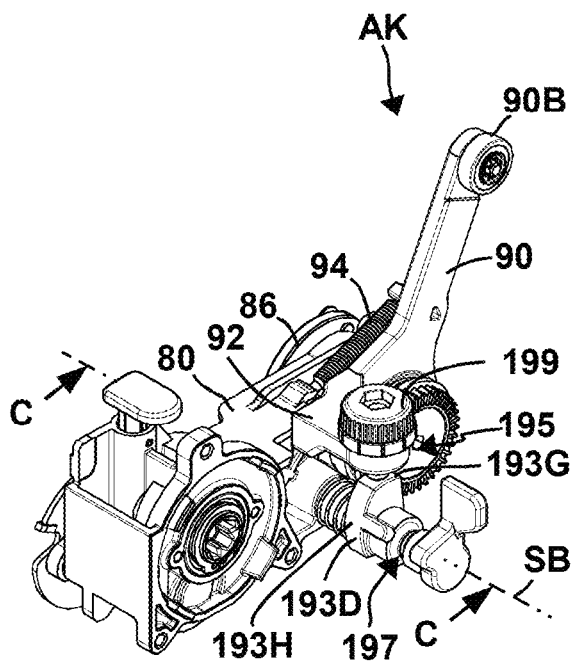
FIG. 39 shows the scoring assembly according to FIG. 38, but in the activation position.
Figure 41:
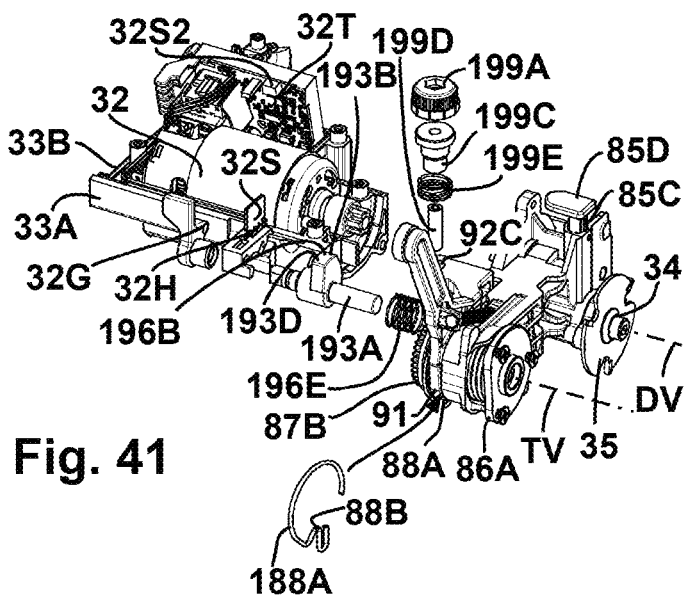
FIG. 41 shows an exploded illustration of the scoring assembly according to FIGS. 38-40.
Figure 40:
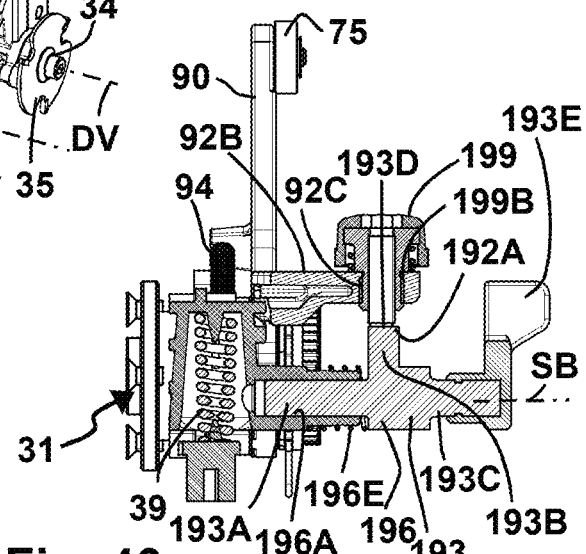
FIG. 40 shows a section along a line of section C-C in FIG. 39 through the scoring assembly.
Figure 42:
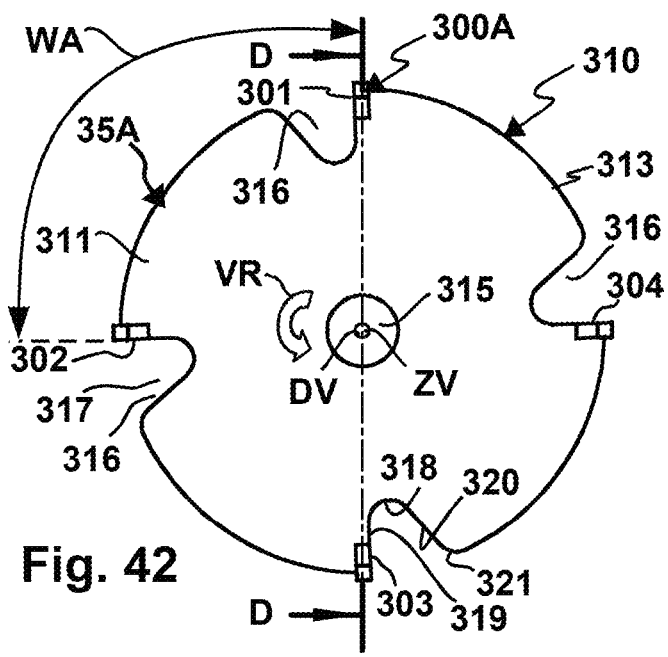
FIG. 42 shows a scoring tool having four scoring teeth.
Figure 44:
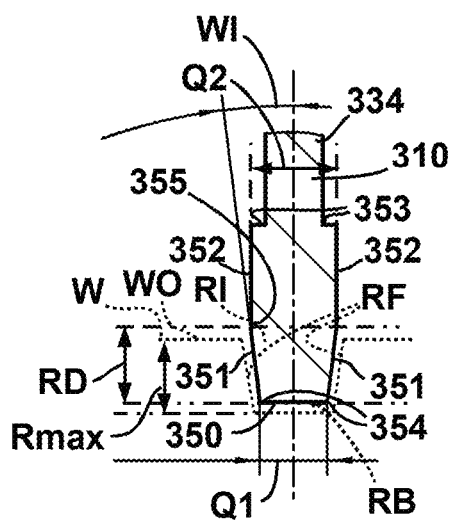
FIG. 44 shows a detail D5 from FIG. 43.
Figure 51:
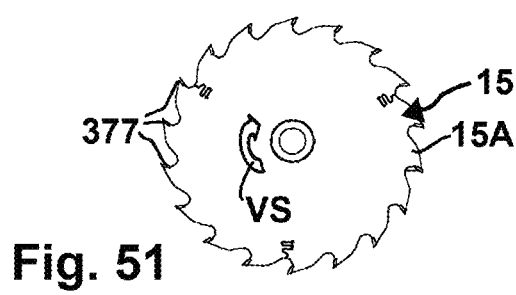
FIG. 51 shows a saw tool from the side.
Figure 43:
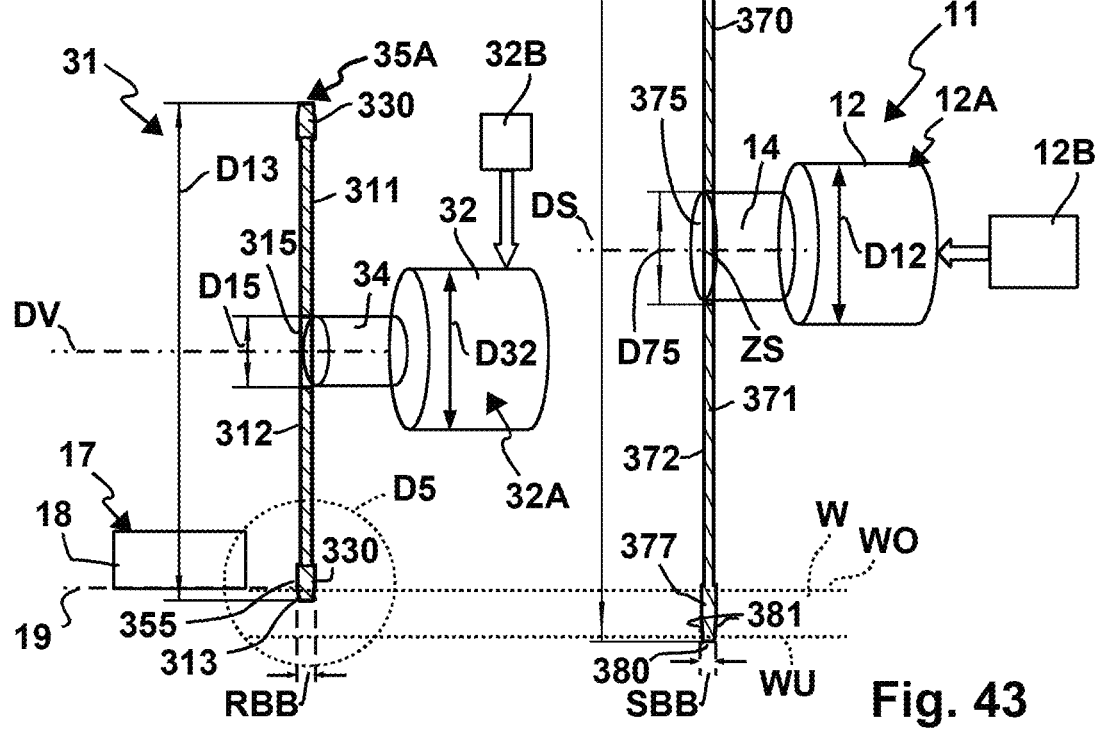
FIG. 43 shows a system comprising the scoring tool according to FIG. 42 in section along a line of section D-D and a saw tool.
Figure 45:
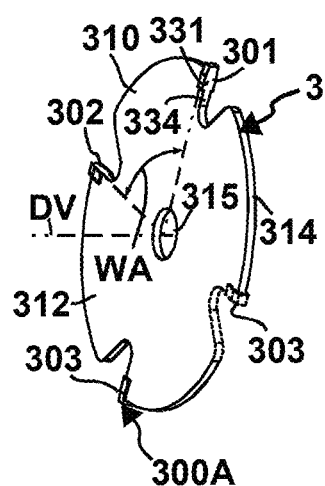
FIG. 45 shows the scoring tool according to FIG. 42 illustrated diagonally in perspective.
Figure 46:
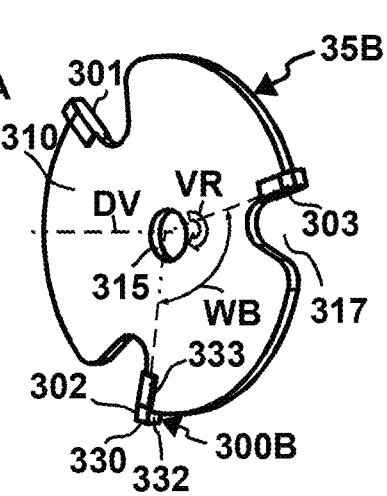
FIG. 46 shows a scoring tool having three scoring teeth.
Figure 47:
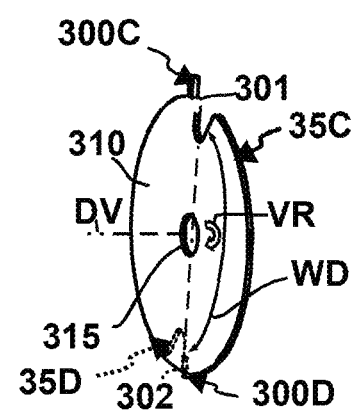
FIG. 47 shows a scoring tool having one scoring tooth, alternatively having two scoring teeth.
Figure 48:
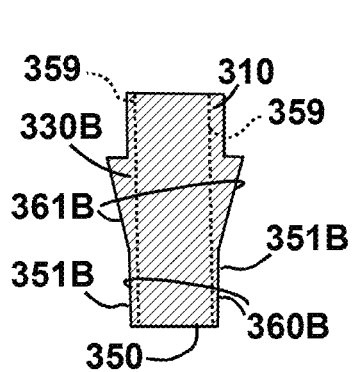
FIG. 48 shows another embodiment of a scoring tooth of a scoring tool, approximately corresponding to the detail D5 according to FIG. 44, having secondary cutting edge sections angled in relation to one another.
Figure 49:
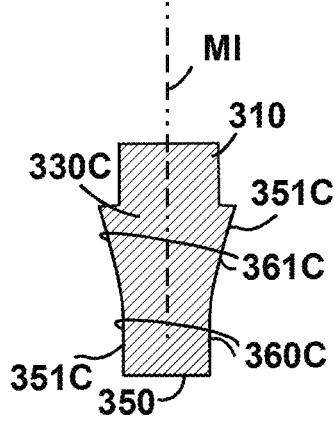
FIG. 49 shows an alternative embodiment of a scoring tooth, approximately like the scoring tooth according to FIG. 48, but having concave secondary cutting edges.
Figure 50:
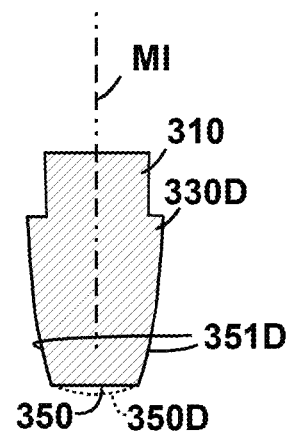
FIG. 50 shows a further embodiment of a scoring tooth having convex secondary cutting edges.

The securing device 100 comprises an actuating element 101, which is pivotably mounted on the protective housing 29 and/or with respect to the handle 26 around a pivot axis DB. When the actuating element 101 is pivoted away from the protective housing 29 or handle 26, thus assumes the position of the securing position SG shown in FIGS. 31 and 32, the securing position SG is immediately recognizable to the operator. The actuating element 101 comprises a handle part 102 having side legs, between which a part of the protective housing 29 is accommodated in the saw operation position FS. The actuating element 101 therefore so to speak clings to the protective housing 29 in the saw operation position FS, and in any case does not protrude in front of it. Actuating element 101 can be grasped manually by an operator on the handle part 102.

A motorized drive 101A for the actuating element 101 is also possible, for example, a schematically shown electric motor, which can drive the actuating element 101 to pivot or rotate and is switchable by means of a schematically shown electrical switch 101B, which is actuatable by an operator, for example, by a pressure actuation.

The handle part 101 is arranged at the free end region of an actuating arm 103 of the actuating element 101, which is pivotably mounted with a bearing section 104 with respect to the pivot axis DB on the protective housing 29.

The actuating element 101 actuates a switch disabling element 105 for disabling the switch 60A. The disabling element 105 has an arm 106 actuatable displaceably and/or pivotably, for example, by the actuating element 101, on the free end region of which an engaging-behind contour 107, for example a hook, is arranged, which in the disabled position of the switch disabling element 105 engages behind the actuating element 60 of the switch 60A, so that it can no longer actuate the switch 60A in the direction of its switching-on position.

It is furthermore advantageous if the actuating element 101 is designed to release the locking device 61. For this purpose, for example, an actuating body 108, for example a cam disc or the like, is movement coupled with the actuating element 101, for example, in the sense of a rotation around the axis DB, which acts on a positioning element 109 such that upon adjustment of the actuating element 101 into the securing position SG, it actuates the actuating element 61A to disengage from the buttress contour 61B. The saw assembly 11 can thus pivot around the depth setting axis TS from the upper depth setting position OT into a tool changing depth setting position WT suitable for a tool change of the saw tool 15.

A detent device 120 is provided for locking in the tool changing depth setting position WT. The detent device 120 has a detent element 121, which is pivotably mounted around a pivot axis S12. The detent element 121 comprises a detent projection 122 to lock with a detent receptacle 123, which is arranged fixed in place on the protective housing 29, for example adjacent to the depth stop guide 63. A spring 124 loads the detent element 121 in the direction of a detent position, in which it can lock with the detent receptacle 123.

The detent device 120 is activatable and deactivatable by the securing device 100. Specifically, when the actuating element 101 is adjusted into the securing position SG, it activates the detent device 120. The actuating element 101 is movement coupled with an actuating body 110 for activating and deactivating the detent device 120, for example in terms of a rotational movement. The actuating body 110 has an actuating link 111 on its side facing toward the detent element 121, which acts on an actuating leg 125 of the detent element 121, specifically in such a way that with the actuating element 101 adjusted into the securing position SG, the detent element 121 is released for locking with the detent receptacle 123 by the spring 124 and/or pre-tensions the spring 124, while with the actuating element 101 adjusted into the saw operation position FS, the detent element 121 is permanently held disengaged from the detent receptacle 123 against the action of the spring 124 and/or the spring 124 does not have spring tension sufficient for locking the detent element 121.

When the saw toolholder 14 is adjusted into the tool changing depth setting position WT, it is arranged in the region of the recesses 58. The scorer toolholder 34 is also adjusted into the tool changing depth setting position, in which it is arranged in the recess 59, by the driving device 70. The toolholders 14, 34 are thus accessible for a tool change of the tools 15, 35.

Furthermore, the actuating element 101 interacts with a blocking device 130 or acts on the blocking device 130, using which the saw toolholder 14 can be blocked against a pivot around the tool axis of rotation DS.

The blocking device 130 has a saw blocking element 131, which is engaged in a blocking position with at least one blocking contour 132, which is connected in a rotationally-fixed manner to the saw toolholder 14. For example, multiple blocking contours 132 in the form of blocking recesses 133 are arranged on a fan wheel 134, which is rotationally coupled to the saw drive motor 12 and/or the saw toolholder 14. The fan wheel 134 has, for example, fan blades 135. The blocking recesses 133 are arranged on the radial outer circumference of the fan wheel 134.

The motorized drive 101A of the securing device 100 simultaneously forms a drive for adjusting the saw blocking element 131 between its blocking position blocking the saw toolholder 14 and its release position releasing it.

The saw blocking element 131 has a blocking projection 136 at its one longitudinal end, which can engage in one of the blocking recesses 133 when it is opposite thereto due to a corresponding rotational position of the fan wheel. The other longitudinal end of the saw blocking element 131 is movably accommodated, in particular displaceably movable, in a bearing, which is not visible in the drawing, and is loaded by a spring 137 in the direction of its blocking position. By adjusting the actuating element 101 into the securing position SG, the saw blocking element 131 is released for actuation by the spring 137 or the spring 137 is pre-tensioned by the actuating element 101 to actuate the saw blocking element 131, so that the blocking projection 136 is pre-tensioned to lock with one of the blocking recesses 133. When the saw toolholder 14 is now pivoted somewhat, one of the blocking recesses 133 reaches a frontal position in relation to the blocking projection 136, so that it locks in the blocking recess 133 and secures the saw toolholder 14 against a further pivot.

Switching on of the scorer drive motor 32 is electrically blocked and thus prevented by the securing device 100 adjusted into the securing position SG. The operator can therefore block the scorer toolholder 34 safely by manually actuating the blocking device 85 and change the scoring tool 35.

Alternatively or additionally to this manual actuation, a mechanical driving coupling (not shown in the drawing) can also be provided between the scorer blocking element 85A and the saw blocking element 131, so that when the saw blocking element 131 is adjusted into the blocking position, the scorer blocking element 85A is also adjusted into the blocking position simultaneously.

When a mechanical connection between the blocking elements 85A and 131 is possible with difficulty or not at all, for example, because a gearing establishing a coupling of the blocking elements 85A and 131 would be complex or has a high space requirement, an electrical coupling is also possible. For example, a sensor 101C is provided for detecting the position of the securing device 100, for example the positions of the actuating element 101. The sensor 101C detects, for example, whether the securing device 100 is in the securing position SG or in the saw operation position FS. In the saw operation position FS, the sensor 101C controls, for example, a The driving device 70 is schematically shown in FIG. 33. It can be seen that the operator can actuate the scoring assembly 31 from the inactive position in the direction of the active position by a pivot actuation of the saw assembly 11, wherein the force transmission takes place through the driving device 70. A scorer drive 32B of the scoring assembly 31 is schematically indicated, wherein, for example, a belt 32C or similar other force transmission element is movement coupled to the saw drive motor 32 and is driven thereby to drive the scorer toolholder 34. A tensioning roller, which is spring-loaded in particular, and/or a length compensation device or the like (not shown in the drawing), for example, can be provided to tension the belt.

In the exemplary embodiment of the handheld machine saw 10C according to FIG. 34, a driving device 70C is provided, using which a scoring assembly 31C is carried along upon actuation of the saw assembly 11 from the upper depth setting position shown in the drawing in the direction of a lower depth setting position, in which the saw tool 15 protrudes in front of the guide surface 19. However, the scoring assembly 31C is loaded by a spring arrangement 39C in the direction of its active position, in which the scoring tool 35 protrudes in front of the guide surface 19, and not in the direction of its inactive position, as in the handheld machine saw 10.

A driving surface or stop surface is provided as the actuation generator 71C on the saw assembly 11, on which an actuation acceptor 72C of the scoring assembly 31C is supported. The actuation acceptor 72C is, for example, arranged on an actuating arm, which protrudes from the scoring assembly 31C starting from the scorer depth setting bearing 36. When the saw assembly 11 is adjusted in the direction of a lower depth setting position of the saw toolholder 34, the actuation generator 71C so to speak releases the actuation acceptor 72C, i.e., the spring arrangement 39C can adjust the scoring assembly 31C from the inactive position in the direction of the active position.

In the active position, the scoring assembly 31C advantageously stops with a stop projection 95C on a scorer depth stop 95D of the guide device 17. The depth stop 95D can be adjustable to set different depth setting positions or active positions, for example, if it is formed by the head of a screw that can be screwed into the guide device 17. The stop projection 95C is provided, for example, on a free end region of an arm of the scoring assembly 31C protruding from the depth setting bearing 36.

In the exemplary embodiment of the handheld machine saw 10D, no driving device is provided between its saw assembly 11 and its scoring assembly 31D. The scoring assembly 31D is pivotably mounted by means of the explained depth setting bearing 36 on the guide device 17 around the depth setting axis TV freely and independently of the saw assembly 11, but has to be manually actuated by an operator. For this purpose, for example, a scorer handle body 237D is provided, for example, in the manner of an actuating button which protrudes upward with respect to the guide device 17 from the scoring assembly 31D. Furthermore, the stop projection 95C for stopping on the depth stop 95D is advantageously provided on the scoring assembly 31D.

A switch 60D is arranged on the handle body 237D, for example, to switch on and/or switch off a drive motor 32 of the scoring assembly 31D. The handle body 237D thus forms an actuation generator 71D for the scoring assembly 31D.

A rotational drive for adjusting the scoring tool 35 between the active position and the inactive position and/or for setting its penetration depth into the workpiece is also possible, for example. For example, a positioning motor 72D could be arranged on the scorer depth setting bearing 36 and adjust the scoring tool 35 between various depth setting positions by rotational drive around the depth setting axis TV.

However, a motorized drive concept is also readily advantageous to adjust a scoring assembly between its inactive position and its active position, which is clear on the exemplary embodiment of the handheld machine saw 10E. Its saw assembly 11 is pivoted manually in the described manner by the operator between the upper depth setting position and one of the lower depth setting positions by means of the depth setting bearing 16, while a positioning motor 72E is provided for the adjustment of the scoring assembly 31E. A sensor is used as the actuation generator 71E of a driving device 70E, which detects the respective rotational positions or relative position of the saw assembly 11 with respect to the guide device 17, thus, for example, a respective set depth setting position. The sensor or actuation generator 71E is connected by means of a control connection, for example, a wireless or wired control connection (not shown in the drawing, however), to the positioning motor 72E, thus an actuation acceptor, of the scoring assembly 31E, to activate it. It is obvious that the positioning motor 72E can also be individually activatable, i.e., is decoupled from the actuation generator or sensor 71E. For example, a switching element 99E, which is electrical in particular, can be provided, using which an operator can individually activate the positioning motor 72E, for example, to introduce a score into a workpiece without a saw cut being produced or to adjust the scoring assembly 31E into the inactive position in order to only produce a saw cut using the saw tool 15. Furthermore, a deactivation device 97E is advantageous, for example, also an electrical switch, using which the positioning motor 72E is actuatable in the direction of the inactive position or upper position of the scorer toolholder 34E and/or using which energizing of the positioning motor 72E in the direction of the active position of the scorer toolholder 34E can be blocked.

The deactivation device 97E and/or the switching element 99E could readily be provided for activating the rotationally driving positioning motor 72D.

In contrast to the above-described scoring assembly, the scoring assembly 31E is not pivotably mounted with respect to the guide device 17, but rather displaceably mounted along a depth setting axis TVS by means of a slide bearing 36E. A spring 39E acts on, for example, a scorer carrier 80E, on which a scorer drive motor 32E is held, in the direction of an inactive position, in which a scoring tool 35E driven by the scorer drive motor 32E is adjusted back behind the guide surface 19. The positioning motor 72E acts in the opposite direction to the spring 39E, thus actuates the scoring tool 35E in the direction of the active position, so that the scoring tool 35E protrudes in front of the guide surface 19 and can engage in the workpiece. However, a depth setting, i.e., a setting of the penetration depth of the scoring tool 35E into the workpiece W, is also settable by means of the positioning motor 72E.

A scoring assembly 31F of a handheld machine saw 10F is also linearly adjustable, namely along a depth setting axis TVS by means of a depth setting bearing, in particular a slide mount 36F. The slide mount 36F comprises, for example, guide rods or support columns, on which a scorer carrier 80F is displaceably mounted with respect to the depth setting axis TVS. The scorer carrier 80F is acted on by a spring arrangement 39F in its inactive position, in which the scoring tool 35F does not protrude in front of the guide surface 19. The scoring tool 35F could comprise a saw blade or scoring blade as such, but is advantageously also a milling tool or milling head like the scoring tool 35E. The scoring tool 35F is driven by a scorer drive motor 32F.

The scoring assembly 31F is also adjustable independently of the saw assembly 11 between its inactive position and one or more active positions.

In contrast to the handheld machine saw 10E, however, the scoring assembly 31F is not adjustable by motor between the active position and the inactive position, but rather manually. A spring arrangement 39F loads the scorer carrier 80F in the inactive position. In the direction of the active position, a hand lever or other actuating element pivotably mounted on the saw assembly 11 is provided as an actuation generator 71F, which actuates a force transmission element 90F by manual actuation, for example, a Bowden cable, cable pull, a pneumatic or hydraulic line, or the like, which acts on an actuation acceptor 72F, for example, a fluidic cylinder, a positioning drive, or the like, to adjust the scoring tool 35 in the direction of the active position against the force of the spring arrangement 39F, wherein this movement is advantageously limited by a depth stop 95F, which is arranged fixed in place on the guide device 17.

A scoring assembly 31X essentially corresponds to the scoring assembly 31, but has alternative depth setting means 195. While the depth setting means 95 effectuate the depth setting by means of the positioning body 93, which supports the actuating arm 92, a depth setting element 199 is arranged on the actuation acceptor arm 90, for example, on an actuating arm projection 92B protruding from the actuating arm 92, and supports itself on a positioning body 193.

The depth setting element 199 has an actuating element 199A, which is connected to a screw section 199B or comprises it. The screw section 199B is screwed into a screw receptacle 92C on the actuating arm projection 92B. The screw section 199B is arranged on a screw body 199C, which is screwed into the screw receptacle 92C. The screw body 199C is connected, on the one hand, to the actuating element 199A and, on the other hand, accommodates a support body 199D, which is pin-like or elongated, for example. A free end region of the support body 199D provides an actuating surface 192A, using which the actuation acceptor arm 90 is actuatable.

The two-part construction made of support body 199D and screw body 199C has the advantage that the support body 199D is positionable relative to the screw body 199C and is then fixable there, for example can be adhesively bonded, to calibrate a first depth setting position or original depth setting position in a fixed manner, which the scoring assembly 31X is to assume. Manufacturing tolerances can thus be compensated for, for example. However, it is readily possible that the depth setting element 199 is in one piece or parts thereof, for example, the support body 199D and the screw body 199C, consist of one part.

Between the actuating element 199A representing so to speak a head of the depth setting element 199 or screw body 199C, on the one hand, and the actuating arm projection 92B, on the other hand, a spring 199E is preferably arranged, which is provided, for example, for a lock and/or a friction lock, to fix the depth setting element 199 in the respective set depth setting position, for example, to clamp it or hold it by friction locking. Inadvertent adjustment movements, in particular triggered by vibrations or the like, can thus be prevented or reduced, for example.

The scorer depth setting means 195 cooperate with a deactivation device 197 and with a positioning body 193. The positioning body 193 protrudes laterally from the scorer carrier 80, similarly to the positioning body 93. However, in contrast to the positioning body 93, the positioning body 193 is pivotably mounted, namely around a pivot axis or positioning axis SB. The positioning axis SB corresponds to the longitudinal axis or longitudinal extension of the positioning body 193.

A longitudinal end or bearing end 193A of the positioning body 193, which is designed, for example, like a bearing pin, is pivotably mounted in a bearing receptacle 196, which is arranged fixed in place on the carrier 80, namely around the positioning axis SB. The bearing receptacle 196A is designed, for example, like a receptacle sleeve or a receptacle tube. The bearing receptacle 196A is provided, for example, on a bearing body 196, which protrudes from the scorer carrier 80 transversely to its longitudinal extension, in particular perpendicularly transversely.

A middle section 193C of the positioning body 193 has a positioning contour 193D, on which the depth setting element 199 is supported with its actuating surface 192A. The positioning contour 193D is located between the longitudinal end or bearing end 193A and an actuating element 193E, for example a handle, which protrudes transversely to the positioning axis SB from the positioning body 93 and can be grasped comfortably by an operator.

The positioning contour 193D has positioning sections 193G and 193H, which are formed by an eccentric circumferential form of the positioning contour 193D with respect to the pivot axis or positioning axis SB. The positioning section 193G is assigned to the activation position AK of the deactivation device 197 and protrudes farther in front of the positioning axis SB than the positioning section 193H, which is assigned to the deactivation position DK. The positioning section 193H thus deflects the depth setting element 199 a lesser distance from the positioning axis SB, whereby the actuation acceptor arm 90 is more remote due to the spring force of the spring arrangement 94 from the actuation generator 71, the guide link 74, than in the activation position AK. This is because the positioning section 193G, which protrudes farther in front of the positioning axis SB, acts in a position deflecting or actuating the actuation acceptor arm 90 farther in the direction of the actuation generator 71, in which the actuation acceptor 72 is in contact with the actuation generator 71.

A spring 196E supports itself on one side on a step of the positioning body 193, on the outer circumference of which the positioning contour 193D is provided, and on the other side on a step on the outer circumference of the bearing body 196 and thus loads the positioning body in terms of a friction lock or a lock in the respective set deactivation position DK or activation position AK. For example, the spring 196E presses a radial projection or flange projection 193B, on the outer circumference of which the positioning contour 193D is arranged, against a support surface 196B. The support surface 196B is provided, for example, on the motor housing 33A.

The scorer drive motor 32 is regularly switched on and switched off by the switch 60A when the saw drive motor 12 is switched on and switched off. In the deactivation position DK of the deactivation device 197, however, the scorer drive motor 32 is not required. It is not problematic per se when the scorer drive motor 32 is energized, even if the scoring assembly 31 or 31X is in its deactivation position DK and/or is in its inactive position IP. The scoring tool 35 is then driven, but does not protrude in front of the guide surface 19 in the sense of engaging in the workpiece W and/or is accommodated in the protective housing 29. The scorer drive motor 32 can advantageously be switched off in this situation, however, for example by a switch 32S and/or 32S2. The switch 32S or 32S2 is, for example, a component of a control device 32T, which is arranged in the motor housing 33A, or is assigned thereto.

The motor housing 33A has, for example, a receptacle part or lower part 33B and a cover 33C which, in the closed state, encapsulates or encloses the scorer drive motor 32 and the control device 32T, so that these electrical components are protected from environmental influences.

The switch 32S or 32S2 comprises, for example, a magnetic sensor or other sensor operating in a contactless manner or is formed thereby. The switch 32S is arranged, for example, on a carrier 32H, for example a printed circuit board, outside the motor housing 33A and communicates with the control device 32T. The switch 32S2 provided alternatively or additionally to the switch 32S is accommodated protected in the interior of the motor housing 33A and is, for example, a component of the control device 32T. An actuating element 32G, for example, a magnetic encoder or the like, is provided for actuating the switch 32S or 32S2. The actuating element 32G is actuatable by the positioning body 193. For example, the actuating element 32G is accommodated in a holding receptacle of the positioning body 193, for example in a pocket. The actuating element 32G could readily also be arranged on the positioning body 93. In any case, the actuating element 32G is, for example, displaceable along the positioning axis SA and/or pivotable around the positioning axis SA or SB, so that its relative position to the sensor or switch 32S or 32S2 changes. The switch 32S communicates with the control device 32T and transmits the respective position of the actuating element 32G thereto. As a function of the respective position of the actuating element 32G to the switch 32S, it or the control device 32T switches the scorer drive motor 32 on or off, namely on in the activation position AK and off in the deactivation position DK of the positioning body 93 or 193.

The scoring tool 35 is explained hereinafter in embodiments 35A, 35B, 35C, 35D. Insofar as the above-mentioned scoring tools 35-35 D have the same components, reference is also made very generally to a scoring tool 35.

For example, each scoring tool 35 has a blade body 310 having mutually opposing flat sides 311, 312. In the scoring tools 35A, 35B, 34C, 35D, scoring tooth arrangements 300A, 300B, 300C, 300D are arranged on a radial outer circumference of the blade body 310. Scoring tooth arrangements 300A, 300B, 300C, 300D have different numbers of scoring teeth 301-304. For example, the scoring tooth arrangement 300A has scoring teeth 301, 302, 303, 304, thus a total of four scoring teeth, while the scoring tooth arrangement 300B only has three scoring teeth 301, 302, 303 and the scoring tooth arrangement 300C has only one scoring tooth 301 and finally the scoring tooth arrangement 300D has only two scoring teeth 301, 302.

The blade body 310 has a machine receptacle 315 at its center ZV for detachable fastening on the scorer toolholder 34 of the machine saw 10. The center ZV is penetrated by a center axis or axis of rotation DV of the scoring tool 35, which is the axis of rotation of the scorer toolholder 34 at the same time, when the scoring tool 35 is fastened on the machine saw 10.

The scoring teeth 301-304 protrude with main cutting edges 350 from a radial outer circumference 313 of the blade body 310 or scoring tool 35, so that they are ready there to cut into the workpiece surface WO of the workpiece W.

The scoring teeth 301-304 thus protrude from a radial outer circumferential surface 314 of the blade body 310. The circumferential surface 314 essentially has the form of a cylindrical jacket.

Comparatively large angle intervals are present between the scoring teeth 301-304. For example, in the scoring tool 35, angle intervals WA of approximately 90° or exactly 90° are provided between the scoring teeth 301-304. In the scoring tool 35B, angle intervals WB of, for example, 120° are provided between the scoring teeth 301-303. In the scoring tool 35C, only a single scoring tooth 301 is present, which results in an angle interval of 360°. If two scoring teeth 301, 302 are provided in the case of the scoring tooth arrangement 300D, they are preferably equidistant to one another and have an angle interval WD of 180°.

It is to be mentioned at this point that of course different angle intervals can also be provided between scoring teeth. For illustration, for example, in the scoring tool 35A, the scoring tooth 303 is shown by dashed lines. It could not be present, for example.

A chip space 316 is provided in front of each scoring tooth 301-304. The chip space 316 is formed by a depression 317 of the blade body 310, which is designed radially inward from the radial outer circumference 313 like a trough, in particular an approximately U-shaped or V-shaped trough. Each depression 317 or each chip space 316 has a bottom 318, from which lateral surfaces 319, 320 extend away in the direction of the radial outer circumference 313. The lateral surfaces 319, 320 are essentially linear. The lateral surface 319 faces toward a respective main cutting edge 350 of a scoring tooth 301-304, while the lateral surface 320 of the chip space 316 is so to speak opposite to this main cutting edge 350. An arc-shaped transition part 321 extends between the lateral surface 320 and the radial outer circumference 313 or the circumferential surface 314.

Except for the chip spaces 316, the radial outer circumference 313 extends in the form of a circle or circular ring around the center axis of the blade body 310 or scoring tool 35, thus the axis of rotation DV. Thus, for example, this arc-shaped profile extends over an angle of at least 30°, preferably at least 40° or even more with respect to the axis of rotation DV, even if four scoring teeth 301-304 are provided in the case of the scoring tool 35A.

These scoring teeth 301-304 each have a cutting body 330. Each cutting body 330 is fastened using a fastening part 331 on the blade body 310, in particular on the lateral surface or close to the lateral surface 319. For example, the lateral surface 319 has a step into which the respective cutting body 332 is inserted. For example, the fastening part 331 is accommodated in such a step. The fastening part 331 of the cutting body 332 is supported at the rear on the blade body 310.

Sections 332 of the cutting body 330 protrude radially outward with respect to the axis of rotation DV from the blade body 310. Lateral sections 333 of the cutting body 330 protrude from the flat sides 311, 312. The sections 332, 333 are therefore mechanically loaded in working operation of the scoring tool 35, thus when it cuts into the workpiece W, but are optimally supported by the fastening part 331. Furthermore, it is advantageous if the cutting bodies 330 have support projections 334 protruding radially inward, which are also supported on the blade body 310.

The cutting teeth 301-304, therefore the cutting bodies 332, have the main cutting edges 350, which extend, for example, in parallel to the axis of rotation DV or center axis of the scoring tool 35.

Secondary cutting edges 351 extend transversely to the main cutting edge 350. The secondary cutting edges 351 are, for example, somewhat more than perpendicular, thus, for example, in an angle range of 90-110°, with respect to the main cutting edge 350, which is located between the secondary cutting edges 351. For example, the main cutting edge 350 and the respective adjacent cutting edge 351 enclose an angle 354 which is at least 90° and at most 110°. In the exemplary embodiment, an angle dimension WI of the angle 354 is, for example, approximately 7°.

The secondary cutting edges 351 extend radially inward with respect to the axis of rotation DV, wherein radially inner end regions 355 have a radial distance RD to the main cutting edge 350. The secondary cutting edges 351, which extend slightly or flatly obliquely inclined with respect to the flat sides 311, 312, enable the production of the score RI in different depths, wherein the transverse width of the respective score RI increases when the scoring tool 35 plunges or penetrates deeper into the workpiece surface WO. The maximum depth Rmax of the score RI is thus fundamentally determined by the radial distance RD.

However, the score RI could be produced even deeper in the present case, specifically, for example, if side parts 352 of the cutting bodies 332 or scoring teeth 301-304 are also designed as cutting edges. The side parts 352 extend, for example, in parallel to a center plane of the blade body 310 or perpendicular to the axis of rotation DV.

A score RI produced by the scoring tool 35 has a score bottom RB, from which side flanks RF extend up to the workpiece surface WO. A transverse width of the bottom RB is determined by the transverse distance Q1 of the secondary cutting edges 351 in the region of the main cutting edge 350 or the length of the main cutting edge 350.

A step 353 is formed between the radially inner ends of the side parts 352 and the respective flat side 311, 312.

The saw tool 15 comprises, for example, a saw blade 15A. A blade body 370 of the saw blade 15A has mutually opposing flat sides 371, 372 and a saw tooth arrangement 376 having saw teeth 377 on its radial outer circumference 373 with respect to the axis of rotation DS, around which the saw blade 15A rotates during saw operation.

The number of the saw teeth 377 is greater than the number of the scoring teeth 301-304. Furthermore, the saw teeth 377 have a smaller angle interval with respect to the axis of rotation DS, around which the saw blade 15A is driven, than the scoring teeth 301-304 with respect to the axis of rotation DV.

The saw tool 15 is provided and designed for sawing or cutting into the workpiece W from its lower side WU. At its center ZS, the saw blade 15A has a machine receptacle 375, which is penetrated by the axis of rotation DS or center axis of the saw blade 15A.

The radial outer circumference 373 has an external diameter D73, which is, for example, three to four times greater than an external diameter D13 of the outer circumference 313 of the scoring tool 35.

An internal diameter D75 of the machine receptacle 375 of the saw blade 15A is greater than an internal diameter D15 of the machine receptacle 315 of the scoring tool 35.

A maximum transverse width of the score RI in the region of the workpiece surface is settable in that the scoring tool 35 penetrates to different depths into the workpiece surface WO. A maximum width of the score RI, thus a maximum distance of the score side flanks RF, is determined by a transverse distance Q2, which the secondary cutting edges 351 have in relation to one another in the region of the maximum radial distance RD. The score RI can thus be at most as wide as the transverse distance Q2.

Such an adaptation is advantageous in particular because the scoring tool 35 can thus be used in conjunction with different saw tools or saw blades, but in any case with saw tools, the cutting width or cut width of which (in relation to the respective length parallel to the axis of rotation DS), can be different. The above-mentioned adaptation is also advantageous in conjunction with manufacturing tolerances or dimensional tolerances of the saw tool or saw blade and/or in the case of different plunging depths of the saw blade into the workpiece or the like.

The scoring tool 35A can be adjusted with respect to its penetration depth into the workpiece W. The scorer toolholder 34 is a component of the scoring assembly 31, which has a scorer drive 23A. The scorer drive 32A comprises a scorer drive motor 32, which drives the scorer toolholder 34 directly or via a gearing (not shown in the schematic illustration), on which the scoring tool 35 is in turn arranged. For example, a mounting flange penetrates the machine receptacle 315. For example, a stepped gearing can be provided between the drive motor 32 and the tool holder 34, so that the axis of rotation of the toolholder 34 and the motor axis of rotation of the drive motor 32 do not align, in particular the motor axis of rotation of the drive motor 32 has a greater distance to a region of the scoring tool 35 which is provided to penetrate into the workpiece W than the drive axis of rotation DV.

The saw toolholder 14, on which the machine receptacle 375 is arranged, is drivable by a saw drive motor 12, for example directly or via a gearing (not shown in the drawing).

The scoring assembly 31 is also arranged, like a saw assembly 11, on a guide device 17, for example movably on a guide body 18 of the guide device 17. Its guide surface 19 is provided for guiding along the workpiece surface WO. Both the saw toolholder 14 and also the scorer toolholder 34 are adjustable in depth with respect to the guide surface 19, so that they protrude different distances in front of it. Penetration depths of the scoring tool 35 and the saw tool 15 into the workpiece W are thus settable.

The saw tool 15 is now set or settable so that is its main cutting edges 380 cut into the workpiece W from the workpiece lower side WU. In addition, secondary cutting edges 381 extend adjacent to the main cutting edges 380 at an angle thereto, which so to speak produce the side flanks of the saw cut SAE, which can be cut using the saw tool 15 into the workpiece W. In any case the saw cut SAE has a saw cut width SBB, which is effectuated by the length of the main cutting edges 380, on the one hand, also by the secondary cutting edges 381, on the other hand, which are inclined, for example, obliquely to the main cutting edge 380 similarly as the secondary cutting edges 351 to the main cutting edges 350.

Since the saw teeth 377 cut into the workpiece W from the workpiece lower side WU and thus move out of it on the workpiece upper side WO, this has the risk that the side flanks of the saw cut SAE will tear out in the region of the workpiece upper side WO. The scoring tool 35 is now to be set or is set with respect to its penetration depth into the workpiece W or the amount by which the scoring tool 35 protrudes in front of the guide surface 19 so that score RI has a score width RBB at the workpiece surface WO which is greater than saw cut width SBB. The saw tool 15 or saw blade 15A then emerges from the workpiece W between the side flanks RF of the score RI at the workpiece surface WO. Thus, for example, if a cover or a coating, a veneer, or the like is arranged on the workpiece surface WO, the cover or the coating is not tangent to or damaged by the saw teeth 377 emerging from the workpiece W.

The oblique inclination of the side flanks RF has the advantage that the score RI has a slight chamfer or bevel in the transition region to the workpiece surface WO.

The saw drive motor 12 has an external diameter D12, the scorer drive motor 32 has an external diameter D32. In relation to the external diameter of the respective driven scoring tool 35 or saw tool 15, the external diameter D12 of the saw drive motor 12 is less than the external diameter D32 of the scorer drive motor 32. Therefore, for example, the ratio of the external circumference D73 to the external circumference D12 or the quotient of external circumference D73 to external circumference D12 is greater than the ratio of the external circumference D13 to the external circumference D32 or the quotient of external circumference D13 to external circumference D32 of the scorer drive motor 32.

Speeds of the saw toolholder 14 and the scorer toolholder 34 can be settable, for example, by means of setting means 12B and/or 32B. It is possible that the scorer toolholder 34 is always operated at the same speed, while the speed of the saw toolholder 14, for example, the speed of the saw drive motor 12, is settable. The configuration is made here so that the scorer toolholder 34 is driven or drivable at at least twice the speed, preferably three times or four times the speed of the saw toolholder 14.

Furthermore, rotational directions VS, VR of the toolholders 14, 34 are opposite. The toolholder 34 for the scoring tool 35 is driven, for example, with the rotational direction VR, which corresponds to a reverse cut saw. The rotational direction VR thus has the effect that the scoring tool 35 so to speak conveys or drives the machine saw 10 along the workpiece W.

The rotational direction VS of the saw toolholder 14 is chosen so that force is applied to the guide surface 19 in the direction of the workpiece surface WO.

In the cutting body 330, the secondary cutting edges and main cutting edges are linear. Alternatively, however, main cutting edges and secondary cutting edges having curved, for example convex or concave profiles, also in combination, or also secondary cutting edges and/or main cutting edges having sections of different inclination and/or curvature are possible.

For example, a cutting body 330B has a main cutting edge 350 having a linear profile, while secondary cutting edges 351B, between which the main cutting edge 350 is arranged, have edge sections 360B, 361B. The edge sections 360B are, for example, linear profiles. The edge sections 360B are, for example, perpendicular to the main cutting edge 350. In contrast, the sections 361B are flatly obliquely inclined with respect to the sections 360B and have an angle of for example, 103-105° with respect to the main cutting edge 350.

A cutting body 330C also has the main cutting edge 350, but secondary cutting edges 351C having sections 360C and 361C. The sections 360C are concave with respect to a center plane MI, which extends between the flat sides 311 and 312 of the blade body 310, but with lesser curvature than the sections 361C.

To illustrate a convex profile, a cutting body 330D is shown, the secondary cutting edges 351D of which are concave with respect to the center plane MI.

Alternatively to the linear main cutting edge 350, for example, the main cutting edge 350D can be provided, which has a convex profile in a direction away from the blade body 310.

Furthermore, it is advantageous if the cutting bodies or scoring teeth of a scoring tool are so to speak symmetrical, i.e., form a cutting edge on mutually opposing sides and thus in the region of each flat side 311, 312. However, it is also possible that scoring teeth or cutting bodies have a cutting edge only on one flat side 311 or 312. This is schematically indicated in the cutting body 330B. For example, instead of a right secondary cutting edge 351B in the drawing, a lateral surface 359 can be provided on a cutting body 330B, which does not protrude from the flat side 311, and on a following or leading cutting body 330B in the circumferential direction of the blade body 310 or scoring tool 35, a lateral surface 359 not protruding from the flat side 312 can be provided instead of a left secondary cutting edge 351B in the drawing.

The invention claimed is:

1. A mobile handheld machine saw having a saw assembly, wherein the saw assembly has a saw toolholder for a saw tool, the saw assembly has a saw drive motor for driving the saw toolholder, the saw assembly having a guide device, wherein the guide device has a guide body having a guide surface, the guide surface extending along a longitudinal axis for guiding the handheld machine saw along a working direction on a workpiece or a guide rail, wherein a saw cut can be introduced along the working direction into the workpiece by means of the saw tool protruding beyond the guide surface in a direction toward the workpiece in a sawing operation of the handheld machine tool, wherein the handheld machine saw has a scoring assembly, wherein the scoring assembly is arranged in front of the saw assembly on the guide device with respect to the working direction, having a scorer toolholder for a scoring tool, and the scoring assembly having a scorer drive for driving the scorer toolholder, wherein a score upstream from the saw cut to be introduced in the working direction can be introduced into the workpiece by means of the scoring tool protruding beyond the guide surface in the direction toward the workpiece in a scoring operation of the handheld machine tool, and wherein the handheld machine saw further comprises a housing and a dust extraction fitting connected at a dust exit end of the housing, the dust extraction fitting being connectable to a suction hose for extracting particles arising during both the introduction of the saw cut by the saw tool into the workpiece and the introduction of the score by the scoring tool into the workpiece, and wherein the housing comprises:
   a saw tool receptacle space for accommodating the saw tool;
   a scoring tool receptacle space for accommodating the scoring tool, the saw tool receptacle space being different from the scoring tool receptacle space;
   a partition wall separating the saw tool receptacle space and the scoring tool receptacle;
   a first dust extraction channel fluidically connecting the saw tool receptacle space to the dust extraction fitting; and
   a second dust extraction channel fluidically connecting the scoring tool receptacle space to the dust extraction fitting, and
   wherein the partition wall separates the first dust extraction channel from the second dust extraction channel at least in a region adjacent the guide surface such that the first dust extraction channel and the second dust connection channel are flow-connected downstream of the partition wall.

2. A mobile handheld machine saw having a saw assembly, wherein the saw assembly has a saw toolholder for a saw tool, the saw assembly has a saw drive motor for driving the saw toolholder, the saw assembly having a guide device, wherein the guide device has a guide body having a guide surface, the guide surface extending along a longitudinal axis for guiding the handheld machine saw along a working direction on a workpiece or a guide rail, wherein a saw cut can be introduced along the working direction into the workpiece by means of the saw tool protruding beyond the guide surface in a direction toward the workpiece in a sawing operation of the handheld machine tool, wherein the handheld machine saw has a scoring assembly, wherein the scoring assembly is arranged in front of the saw assembly on the guide device with respect to the working direction, having a scorer toolholder for a scoring tool, and the scoring assembly having a scorer drive for driving the scorer toolholder, wherein a score upstream from the saw cut to be introduced in the working direction can be introduced into the workpiece by means of the scoring tool protruding beyond the guide surface in the direction toward the workpiece in a scoring operation of the handheld machine tool, and wherein the scoring assembly has a scorer dust extraction device for extracting particles arising during the introduction of the score by the scoring tool into the workpiece, and
   wherein the handheld machine saw further comprises a scoring tool receptacle space for accommodating the scoring tool, wherein the scoring tool receptacle space is fluidically connected to a dust extraction fitting for connecting a suction hose, and wherein particles can flow out of the scoring tool receptacle space via the suction hose, and
   wherein the handheld machine saw further comprises a saw tool receptacle space for the saw tool, the saw tool receptacle space being different from the scoring tool receptacle space, and
   wherein the saw tool receptacle space and the scoring tool receptacle space are separated from one another by at least one partition wall, the at least one partition wall having a fixed partition wall section and a movable partition wall section, the movable partition wall section being movable in relation to the fixed partition wall section, wherein the partition wall sections are arranged adjacent to one another, and in at least one relative position in relation to one another, adjoin or overlap one another directly or in such a way that they form a closed or essentially closed flow wall, along which a particle flow containing particles generated by the scoring tool or the saw tool can flow.

3. The handheld machine saw as claimed in claim 1, further comprising a cover wall for covering the saw tool receptacle space and/or the scoring tool receptacle space, wherein a viewing window is arranged on the wall, and wherein a part of the scoring tool and/or the saw tool is visible through the viewing window, wherein a cover element is mounted on the viewing window movably between an open position exposing the viewing window and a cover position covering the viewing window by means of a bearing, in particular a slide bearing.

4. The handheld machine saw as claimed in claim 3, wherein the cover element is at least partially transparent or translucent, so that the working region of the saw tool or scoring tool is visible through the cover element in its cover position and/or wherein the cover element comprises a plate body or is formed thereby.

5. The handheld machine saw as claimed in claim 3, wherein the cover element has a scoring tool section for covering a part of the scoring tool and a saw tool section for covering a part of the saw tool, wherein the scoring tool section and the saw tool section have different area extensions and/or longitudinal extensions.

6. The handheld machine saw as claimed claim 1, wherein the partition wall extends up to the guide surface or comprises a partition wall section which directly adjoins the guide surface.

7. The handheld machine saw as claimed in claim 6, wherein the at least one partition wall has a fixed partition wall section and a partition wall section movable in relation to the fixed partition wall section, wherein the partition wall sections are arranged adjacent to one another, and in at least one relative position in relation to one another, adjoin or overlap one another directly or in such a way that they form a closed or essentially closed flow wall, along which a particle flow containing particles generated by the scoring tool or the saw tool can flow.

8. The handheld machine saw as claimed in claim 7, wherein one of the partition wall sections has a partition wall receptacle, for the engagement of the other partition wall section when the movable partition wall section is adjusted toward the fixed partition wall section, and/or wherein the partition wall sections are designed to be telescopic.

9. The handheld machine saw as claimed in claim 7, wherein the movable partition wall section is arranged on a cover element.

10. The handheld machine saw as claimed in claim 1, further comprising a flow guiding surface, which is arranged on the partition wall at or adjacent to an exit region of the scoring tool from the workpiece.

11. The handheld machine saw as claimed in claim 2, wherein the saw assembly has a saw dust extraction device for extracting particles arising during the introduction of the saw cut by the saw tool.

12. The handheld machine saw as claimed in claim 11, wherein the saw dust extraction device has a dust extraction fitting for connecting a suction hose and is fluidically connected to the saw tool receptacle space, so that particles can flow out of the saw tool receptacle space via the dust extraction fitting.

13. The handheld machine saw as claimed in claim 12, wherein the dust extraction fitting fluidically connected to the saw tool receptacle space is fluidically connected to the scoring tool receptacle space, so that particles generated by the scoring tool can flow out of the scoring tool receptacle space via the dust extraction fitting, or is a dust extraction fitting separate from a dust extraction fitting fluidically connected to the scoring tool receptacle space.

14. The handheld machine saw as claimed in claim 12, wherein the dust extraction fitting fluidically connected to the saw tool receptacle space is fluidically connected via a first dust extraction channel to the saw tool receptacle space, wherein the first dust extraction channel is separated by an intermediate wall from a second dust extraction channel fluidically connected to the scoring tool receptacle space at least in sections.

15. The handheld machine saw as claimed in claim 14, wherein the intermediate wall extends up to the saw tool receptacle space or extends along the saw tool receptacle space up to the dust extraction fitting, so that particle flows generated by the saw tool and by the scoring tool are only mixed with one another on an outflow side in the region of the dust extraction fitting.

16. The handheld machine saw as claimed in claim 2, wherein the saw tool receptacle space and the scoring tool receptacle space are provided in a shared protective housing for accommodating the saw tool and the scoring tool.

17. The handheld machine saw as claimed in claim 1, wherein the saw toolholder is mounted movably on or with respect to the guide device by means of a saw depth setting bearing between an upper depth setting position and at least one lower depth setting position, wherein the saw tool protrudes farther beyond the guide surface in the lower depth setting position than in the upper depth setting position.

18. The handheld machine saw as claimed in claim 17, wherein the scorer toolholder is movably mounted on or with respect to the guide device by means of a scorer depth setting bearing, which is separate from the saw depth setting bearing, between at least one active position, in which the scoring tool arranged on the scorer toolholder protrudes in front of the guide surface, and an inactive position, in which the scoring tool is adjusted behind the guide surface.

19. The handheld machine saw as claimed in claim 2, wherein the dust extraction fitting is fluidically connected via a dust extraction channel to the scoring tool receptacle space.

20. A mobile handheld machine saw having a saw assembly, wherein the saw assembly has a saw toolholder for a saw tool, the saw assembly has a saw drive motor for driving the saw toolholder, the saw assembly having a guide device, wherein the guide device has a guide body having a guide surface, the guide surface extending along a longitudinal axis for guiding the handheld machine saw along a working direction on a workpiece or a guide rail, wherein a saw cut can be introduced along the working direction into the workpiece by means of the saw tool protruding beyond the guide surface in a direction toward the workpiece in a sawing operation of the handheld machine tool, wherein the handheld machine saw has a scoring assembly, wherein the scoring assembly is arranged in front of the saw assembly on the guide device with respect to the working direction, having a scorer toolholder for a scoring tool, and the scoring assembly having a scorer drive for driving the scorer toolholder, wherein a score upstream from the saw cut to be introduced in the working direction can be introduced into the workpiece by means of the scoring tool protruding beyond the guide surface in the direction toward the workpiece in a scoring operation of the handheld machine tool, and wherein the scoring assembly has a scorer dust extraction device for extracting particles arising during the introduction of the score by the scoring tool into the workpiece, and

- wherein the saw assembly has a saw dust extraction device for extracting particles arising during the introduction of the saw cut by the saw tool, the saw dust extraction device having a dust extraction fitting for connecting a suction hose, and the saw dust extraction device being fluidically connected to a saw tool receptacle space, so that particles can flow out of the saw tool receptacle space via the dust extraction fitting, and
- wherein the dust extraction fitting fluidically connected to the saw tool receptacle space is fluidically connected via a first dust extraction channel to the saw tool receptacle space, wherein the first dust extraction channel is separated by an intermediate wall from a second dust extraction channel fluidically connected to a scoring tool receptacle space at least in sections at an exit region at which the scoring tool and the saw tool exit from the workpiece, and
- wherein the intermediate wall extends up to the guide surface or comprises a intermediate wall section which directly adjoins the guide surface.

* * * * *